United States Patent [19]

Sato

[11] 4,160,281
[45] Jul. 3, 1979

[54] CASSETTE CHANGER

[75] Inventor: Seizi Sato, Yokohama, Japan

[73] Assignee: Sony Corporation, Tokyo, Japan

[21] Appl. No.: 876,263

[22] Filed: Feb. 9, 1978

[30] Foreign Application Priority Data

Feb. 21, 1977 [JP] Japan .................................. 52-17927

[51] Int. Cl.² ...................... G11B 15/68; G11B 23/04
[52] U.S. Cl. ...................................... 360/92; 242/199
[58] Field of Search .......................... 360/92; 352/6–8,
352/123; 242/197–200, 194

[56] References Cited

U.S. PATENT DOCUMENTS

| 3,638,953 | 2/1972 | Kodama et al. | 242/199 |
| 3,646,611 | 2/1972 | Ikeda | 360/92 |
| 3,690,587 | 9/1972 | Kitazawa | 360/92 |
| 3,690,679 | 9/1972 | Sterly | 360/92 |
| 3,698,722 | 10/1972 | Ban | 360/92 |
| 3,791,622 | 2/1974 | Nupnau | 360/92 |
| 3,836,154 | 9/1974 | Ishikawa | 360/92 |
| 3,860,964 | 1/1975 | Kozu et al. | 360/92 |
| 4,072,991 | 2/1978 | Kok | 360/92 |

Primary Examiner—Alfred H. Eddleman
Attorney, Agent, or Firm—Lewis H. Eslinger; Alvin Sinderbrand

[57] ABSTRACT

In a cassette recording and/or reproducing apparatus of the tape in which an operating mode selector, such as a push button for selecting a recording and/or reproducing operation, is automatically returned to an original position from a record/play position at the end of the playing of a cassette; a cassette changer having a cassette holder movable from a record/play position to an eject mode, further includes at least one, and preferably five resilient members and a loading device for receiving a second cassette to be exchanged with a first cassette in the holder with the resilient member or members being charged with elastic energy when the second cassette is loaded in the changer, and for exchanging the second cassette for the first cassette by means of the elastic energy discharged from the resilient member or members upon the return of the operating mode selector to its original position. Preferably, five springs respectively provide the elastic energy for selecting the eject mode, withdrawing the first cassette from the holder, inserting the second cassette into the holder, moving the second cassette and holder to the record/play position, and moving the operating mode selector to the record/play position.

16 Claims, 28 Drawing Figures

CASSETTE CHANGER

BACKGROUND OF THE INVENTION

1. Field of the Invention

This invention relates to a cassette changer for recording and/or reproducing apparatus such as a video tape recorder (V.T.R.), or other tape recorder. With the cassette changer, a tape cassette in which recorded tape is wound is automatically exchanged for another cassette.

2. Description of the Prior Art

In a cassette type V.T.R., a tape cassette is settled in the operative position, and video signals and audio signals are recorded on magnetic tape wound in the cassette. In the recording mode or the reproducing mode, a tape is supplied from a supply reel and wound on a take-up reel, and the tape runs at a predetermined speed contacting with a rotary video magnetic head and a stationary audio magnetic head. When the all of the tape is wound on the take-up reel, tape end is detected by tape-end detecting means, and a recording push-button or a reproducing push-button is restored to its original position by the operation of a shut-off mechanism, whereby, the V.T.R. is changed over to the stop mode. When an operator wants to record further a successive tape cassette must be used. The operator has to withdraw the recorded cassette by pushing the eject button, settle the new cassette and push the recording push-button again. Accordingly, for long time recording, the operator has to change the cassette many times. Further, recording is achieved at most only the time corresponding to the length of the tape of a single tape cassette, during the operator's absence.

In this respect, U.S. Pat. No. 3,646,611 shows a novel mechanism in which a plurality of stacked cassettes housed in a cassette housing can be automatically played in succession in such a manner that when the play of a cassette which has first been brought into the play position is completed the cassette is discharged out of the cassette housing and the next cassette is brought into the play position.

U.S. Pat. No. 3,690,587 shows an automatic tape cassette recording and playback apparatus having cassette support means for a plurality of tape cassettes, means for slidably supporting the cassette support means and hving guide hole means, tape recording and playback means, means for driving the cassette support means, means for driving one of the plurality of tape cassettes, a mechanism for interlocking the tape recording and playback means, the means for driving the cassette support means, a motor for driving the interlocking mechanism and the tape driving means, means for selectively driving the interlocking mechanism, tape detecting means, and electric circuit means for controlling the motor and the interlocking mechanism driving means.

U.S. Pat. No. 3,698,722 shows a multiple tape cartridge playing apparatus comprising a rotatable carriage on which a plurality of endless magnetic tape cartridges mounted and which is rotatably driven to selectively bring one of the cartridges into the play position, a reciprocally movable deck provided with a rotary capstan and a magnetic head for playing the cartridge brought into the play position, and deck driving means for moving the deck between a reproducing position where the capstan and the magnetic head engage the cartridge in the play position and a reproducing position where the capstan and the magnetic head are disengaged from the cartridge. A control circuit for the multiple tape cartridge playing apparatus comprises a cartridge selecting switch group for indexing the cartridge to be played, rotary switching means operable in response to rotation of the carriage, switches actuated by said deck, and solenoids. By operation of one of the switches in the cartridge selecting switch group, the deck is moved from the reproducing position to the retracted position, said carriage being rotated to bring the cartridge indexed by the switch into the play position during the time that the deck is retained in the retracted position, the deck being moved from the retracted position to the reproducing position to initiate the play of the designated cartridge after the cartridge has been brought to the play position.

All of these apparatus provide electrical driving means, such as electric motors, and electrical control circuitry. Further, an electrical power source should be supplied to these apparatus for changing the cassette. Accordingly, these apparatus are complex, and expensive.

OBJECTS AND SUMMARY OF THE INVENTION

An object of this invention is to provide a cassette changer which does not include an electrical driving means and operates with no supply of electric energy.

Another object of this invention is to provide a cassette changer which is compact, simple and inexpensive.

A further object of this invention is to provide a cassette changer which performs the different plural operations automatically and surely for exchanging cassettes in a predetermined order without the need for electrical controlling means.

A still further object of this invention is to provide a cassette changer which provides plural resilient members and fly wheels which store the charged energy of the resilient members and perform the operations at moderate speed.

A still further object of this invention is to provide a cassette changer which performs the operations for exchanging cassettes not only fully automatically but also permits partially manual operation.

In accordance with an aspect of this invention, a cassette changer is provided for exchanging cassettes automatically in a cassette recording and/or reproducing apparatus, such as a video tape recorder. In such apparatus, an operating mode selector, such as a record and/or play-back push button, is moved from an original position to an active position to effect a recording and/or reproducing operation, and the selector is automatically returned to its original position at the end of the recording and/or reproducing operation. Also in such cassette recording and/or reproducing apparatus a cassette holder for holding a first cassette is movable between a lowered or recording and/or reproducing position and a raised or eject position in response to the selection of an eject mode, for instance as by pressing an eject push button. For purposes of exchanging cassettes, the changer includes one or more resilient members such as springs, cassette loading means for receiving a second cassette to be exchanged with the cassette initially in the holder, means for charging the resilient member or members with elastic energy upon loading of the second cassette in the cassette changer, and means for exchanging the second cassette for the initial cassette in the holder, wherein the energy for effecting the exchange of cassettes is provided by the discharge of elastic energy of the resilient member or members in response to the return of the operating mode selector to its original position. The changer preferably employs first, second, third, fourth, and fifth resilient members which respectively provide the energy for selecting the eject mode, withdrawing the first or initial cassette from the holder, inserting the second cassette into the holder, moving the second cassette and holder to the recording and/or reproducing position, and moving the operating mode selector to its second position, thereby effecting an automatic, hands-off exchange of cassettes.

A changer embodying the invention also features a lid rotatable between an open position for loading the second cassette and a closed position. During loading, rotation of the lid serves to charge the resilient members with elastic energy, and during the exchange operation, the lid is moved to its open position wherein the exchanged first cassette is received. The weight of the exchanged first cassette cooperates with the fourth resilient member to assist in shifting the cassette holder, with the second cassette, to the recording and/or reproducing position.

The above, and other objects, features and advantages of this invention will be apparent from the following detailed description of illustrative embodiment thereof which is to be read in accordance with the accompanying drawings.

BRIEF DESCRIPTION OF THE DRAWINGS

The drawings show a cassette changer for a V.T.R. according to one embodiment of this invention.

DESCRIPTION OF THE PREFERRED EMBODIMENT

Figure 1:
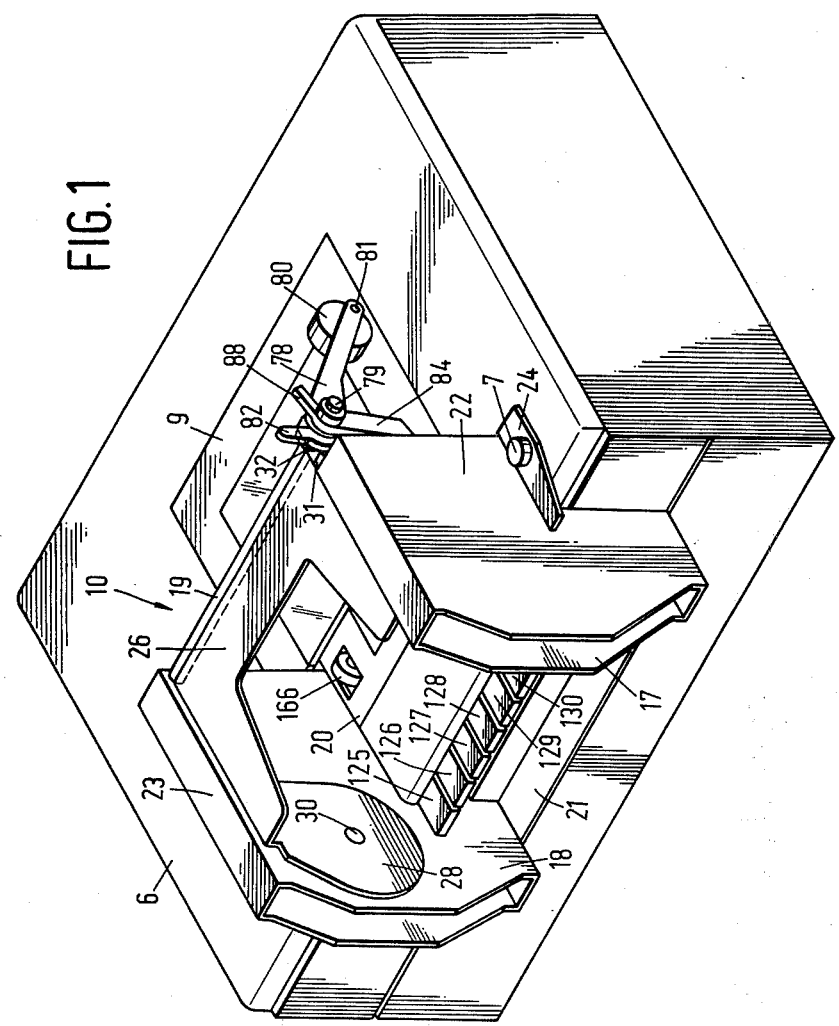
FIG. 1 is a perspective view of a V.T.R., on which the cassette changer is arranged.

Referring to the drawings, there will be described a cassette changer a V.T.R. according to one embodiment of this invention.

First, there will be described briefly, the òperation of the cassette changer. When all magnetic tape in a first tape cassette 161, located in the V.T.R. apparatus, is wound on a take-up reel, a recording push-button 16 and a reproducing push-button 14 are restored to the original position by an auto-shut-off mechanism. By the restoring movement of the push-buttons 14 and 16, elastic energy previously charged in a first spring 1 is discharged therefrom to actuate an ejecting push-button 11, whereby a cassette holder 9 moves upward. Next, by the upward movement of the cassette holder 9, elastic energy previously charged in a second spring 2 is discharged and the cassette 161 is thereby withdrawn from the cassette holder 9. Then a second cassette 162 (FIG. 6, FIG. 7) is lowered, and elastic energy previously charged in a third spring 3 is discharged. Thereby the cassette 162 is inserted into the cassette holder 9. Next, the cassette holder 9 is pushed down and the new cassette 162 is inserted in the v.T.R. apparatus by a fourth spring 4. Finally, the recording push-button 16 and the reproducing push-button 14 are pushed by a fifth spring 5, and video signals and audio signals are recorded on a magnetic tape of the cassette 162.

As mentioned above, this cassette changer is provided with the five springs 1, 2, 3, 4 and 5. The consectutive operations for exchanging cassettes are achieved by discharging the elastic energy of the springs 1, 2, 3, 4 and 5 in turn. Accordingly, the cassette changer is very compact, and it does not require an electrical driving means such as a motor or plunger solenoid, nor a system controller.

Figure 2:
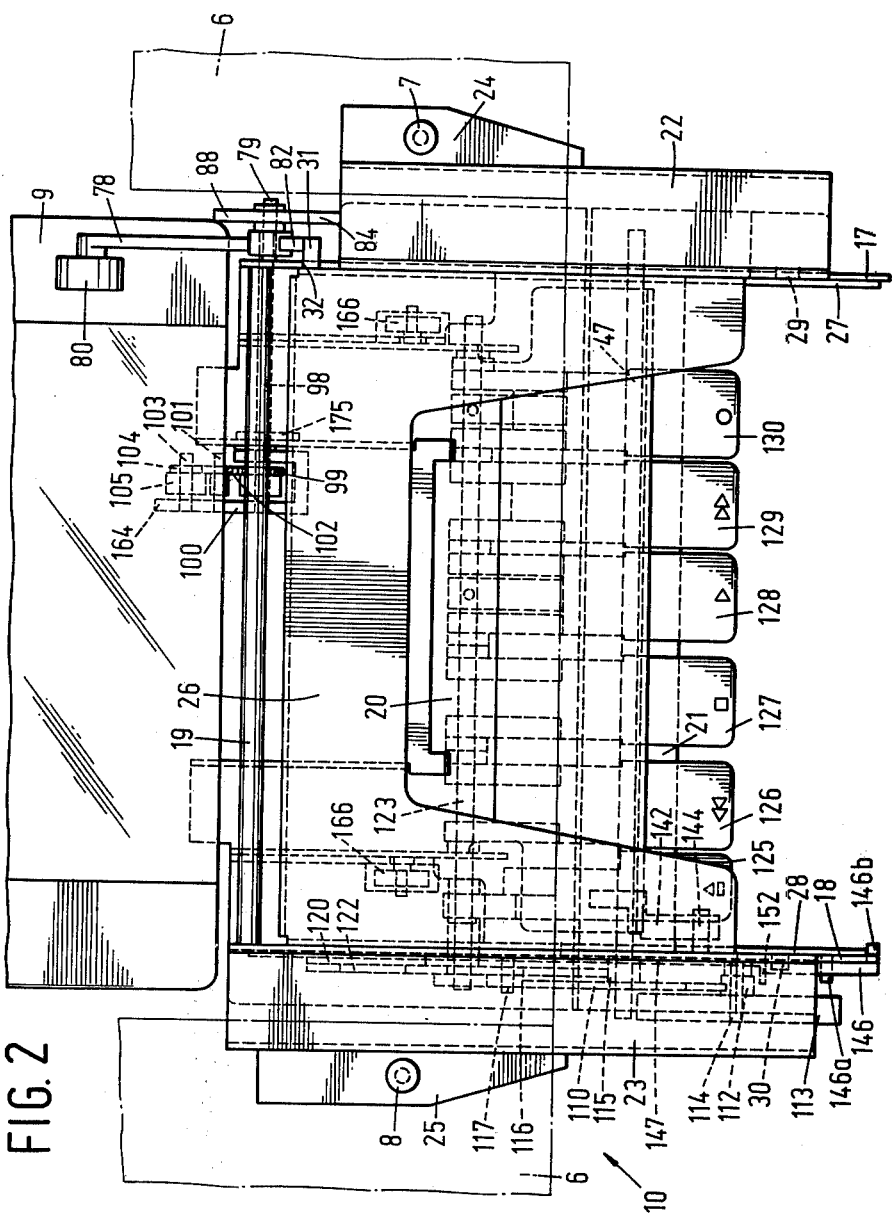
FIG. 2 is a plan view of the cassette changer.
Figure 3:
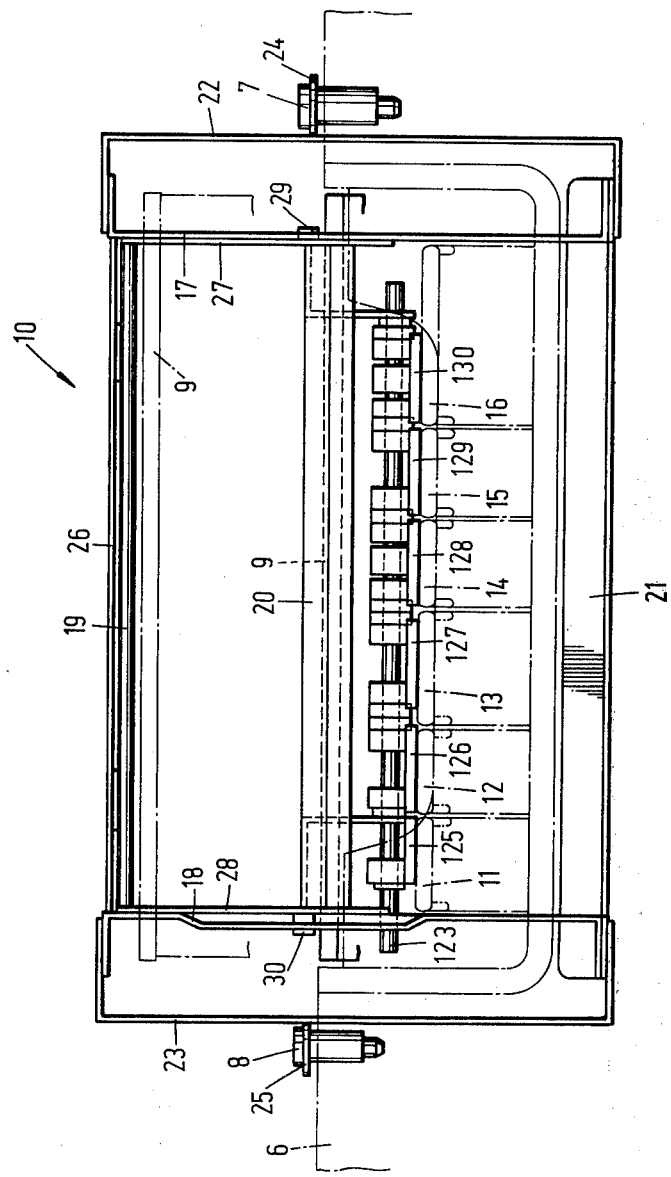
FIG. 3 is a front view of the cassette changer.

As shown in FIG. 1, 2 and 3, the cassette changer 10 is demountably attached onto the V.T.R. apparatus 6, and is connected with the apparatus by screws 7 and 8. When the cassette changer 10 is attached to the V.T.R. apparatus, the cassette changer 10 is adjacent to and just in front of the cassette holder 9 of the V.T.R. Further more, the cassette changer 10 is so positioned that the changer 10 hangs over an ejecting push-button 11, a rewind push-button 12, a stop push-button 13, a reproducing push-button 14, a fast-forward push-button 15 and a recording push-button 16, which are arranged in line at the front end of the V.T.R. apparatus 10.

The cassette changer 10 provides a right side chassis 17 and a left side chassis 18, and these chassis 17 and 18 are connected to each other by a connecting rod 19, an intermediate chassis 20 and a bottom reinforcing chassis 21. Covers 22 and 23 are provided outside of the chassis 17 and 18 respectively. The chassis 17 and the cover 22 form a right side gear box, and the chassis 18 and the cover 23 form a left side gear box. The covers 22 and 23 provide respective mounting tabs 24 and 25. By these mounting tabs 24 and 25, the cassette changer 10 is connected with the V.T.R. apparatus through the screws 7 and 8.

Figure 4:
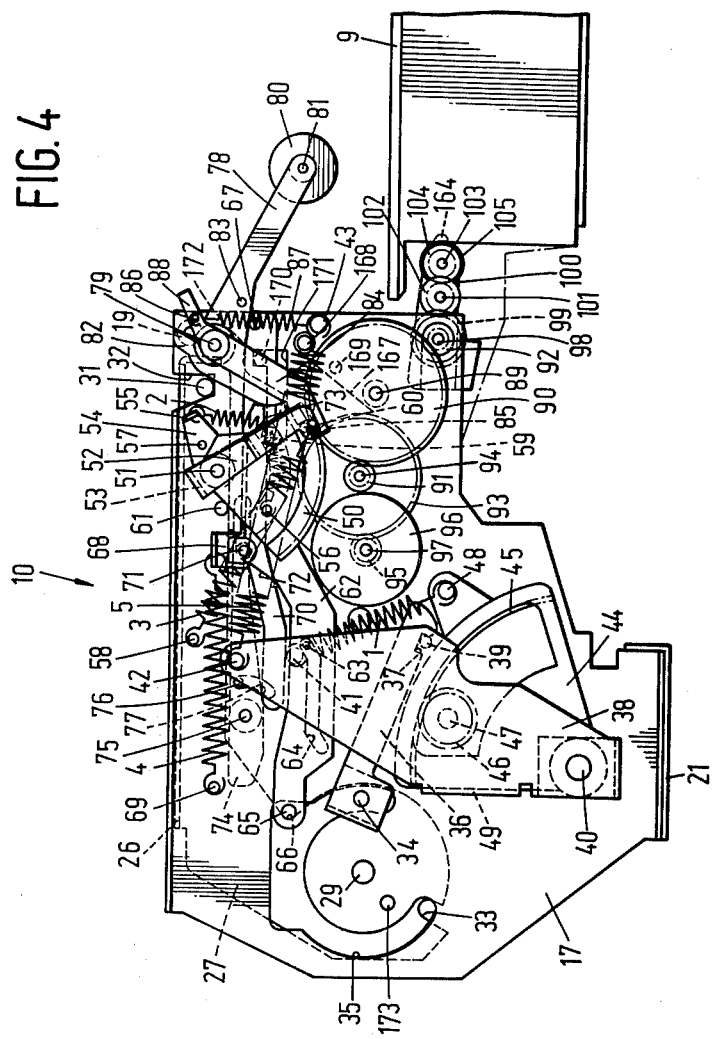
FIG. 4 is a right side view of the cassette changer, a cover of which is removed.
Figure 6:
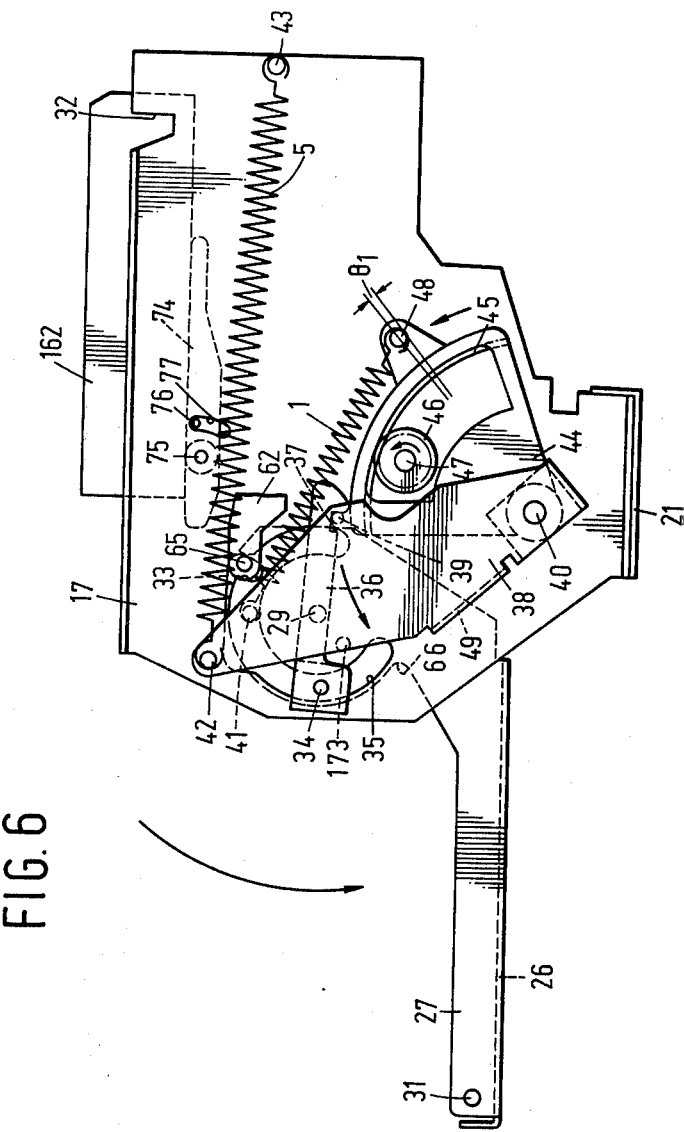
FIG. 6 is a right side view of the cassette changer, a lid 26 of which is opened.
Figure 7:
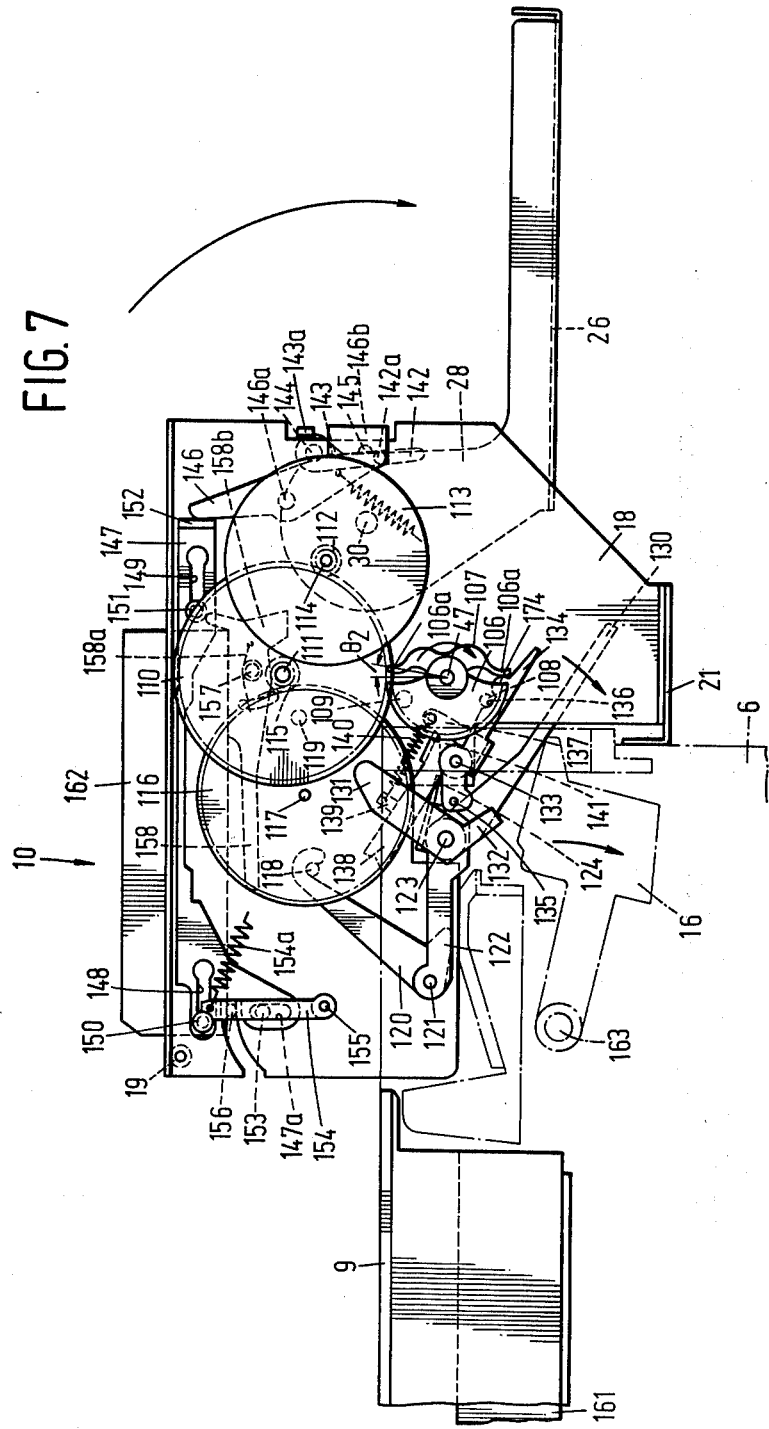
FIG. 7 is a left side view of the cassette changer, a lid 26 of which is opened.

A handle or lid 26 is arranged between the chassis 17 and 18. The lid 26 provides a pair of arms 27 and 28. The arms 27 and 28 are connected with the chassis 17 and 18 by means of a pair of pins 29 and 30 respectively. Thus the lid 26 is rotatably supported by the chassis 17 and 18 as shown in FIG. 6 and FIG. 7. A pin 31 is fixed on the right side of the top of the lid 26 (FIG. 1, FIG. 4). The pin 31 is received in the cut-out portion 32 formed on the right side chassis 17, as shown in FIG. 4, when the lid 26 is closed.

A U-shaped cut-out portion 33 is formed on the arm 27 of the lid 26. Further, a pin 34 is fixed on the arm 27. The pin 34 penetrates a circular arc-shaped opening 35 formed on the chassis 17, and supports a hook lever 36 rotatably mounted outside of the chassis 17. A hook portion 37 of the hook lever 36 engages with a lock pin 39 fixed on a rhombus lever 38.

The rhombus lever 38 is rotatably supported by a pin 40 fixed on the chassis 17. Two pins 41 and 42 are fixed on the lever 38. One end of the first spring 1 is engaged with the pin 41, and one end of the fifth spring 5 is engaged with the pin 42. Another end of the fifth spring 5 is engaged with a pin 43 mounted on the chassis 17.

A large segment gear 44 is arranged on the outside of the chassis 17. The segment gear 44 is rotatably supported by the pin 40 which supports the rhombus lever 38. An interval gear 45 defined on the large segment gear 44 engages with a pinion 46. The pinion 46 is fixed with a shaft 47 which penetrates through the chassis 17 and 18. A pin 48 is fixed on the large segment gear 44. Another end of the first spring 1 is engaged with the pin 48. The side portion of the large segment gear 44 is contacting with a bent tab 49 formed integrally with the rhombus lever 38.

Further, a small segment gear 50 is arranged out-side of the chassis 17. The small segment gear 50 is rotatably supported by a pin 51 fixed on the chassis 17. The pin 51 further supports a supporting lever 52 rotatably relative to the chassis 17. A bent portion 53 of the lever 52 is able to contact with the right side portion of the small segment gear 50. An arm 54 is formed on the lever 52, and a bent tab 55 is formed at the top of the arm 54. One end of the second spring 2 is engaged with the bent tab 55. Other end of the spring 2 is engaged with a pin 56 fixed on the small segment gear 50. Further, the arm 54 provides a pushing pin 57. One end of the third spring 3 is engaged with top of the supporting lever 52. Other end of the third spring 3 is engaged with a pin 58 fixed on the chassis 17. A lock pin 59 is fixed on the supporting lever 52 and another lock pin 60 is fixed on the small segment gear 50. A stopper pin 61 is mounted on the chassis 17 beside the small segment gear 50. This pin 61 is so positioned as to be able to contact with the small segment gear 50.

A charging slide 62 is arranged outside of the right side chassis 17. A pin 63 is fixed on the slide 62. The pin 63 is engaged with a meandering oblong opening 64 defined on the chassis 17, whereby the charging slide 62 is slidably and rotatably supported relative to the chassis 17. A pin 65 is fixed on the front end of the slide 62. The pin 65 engages with a recess 66 formed on the arm 27 of the lid 26. Another pin 67 is fixed on the rear end of the slide 62. A projected tab 68 is formed on the charging slide 62. One end of the fourth spring 4 is engaged with the top of the projected tab 68. Other end of the spring 4 engages with a pin 69 fixed on the chassis 17. Further a lock lever 70 is supported by the projected tab 68 through a pin 71. The lock lever 70 is urged by a torsion spring 72 clockwise about the pin 71 in FIG. 4. An L-shaped lock portion 73 is formed at the top end of the lever 70. The lock portion 73 engages with the pin 59 of the supporting lever 52.

A cassette supporting lever 74 is arranged inside the chassis 17, symmetrically with the lock lever 70 relative to the chassis 17. The supporting lever 74 is rotatably supported retative to the chassis 17 by a pin 75. A pushing pin 76 is fixed on the side portion of the lever 74. The pushing pin 76 penetrates a circular arc shaped opening 77 formed on the chassis 17 to be able to contact with the top end of the lock lever 70.

An actuating lever 78 is arranged at the rear side of the small segment gear 50, and is rotatably supported by a pin 79 relative to the chassis 17. A roller 80 is provided at the top end of the lever 78 and is supported rotatably by a pin 81. An arm 82 is formed integrally with the lever 78. Further, a pin 83 is fixed on the lever 78. Another end of the lever 78 is so positioned as to be able to contact with the end portion of the lock lever 70.

Adjacent to the actuating lever 78, a lock lever 84 is arranged and is supported rotatably by the chassis 17 through the pin 79. An L-shaped lock portion 85 is formed at one end of the lever 84, and the lock portion 85 engages with the pin 60 fixed on the small segment gear 50. A pin 86 is fixed on the lever 84. One end of a spring 87 engages with the pin 86. Another end of the spring 87 engages with the pin 43. Further, an arm 87 is formed integrally with the lever 84. The arm 88 is so positioned as to be contactable with a pin 83 mounted on the actuating lever 78.

The above mentioned small segment gear 50 engages with a gear 90 which is rotatably supported by the chassis 17 through a pin 89. The gear 90 further engages with a pair of pinions 91 and 92. The pinion 91 is fixed to a gear 93, and the pinion 91 and the gear 93 are rotatably supported by the chassis 17 through a pin 94. The gear 93 further engages with a pinion 95. The pinion 95 is fixed to the fly wheel 96, and the pinion 95 and the fly wheel 96 are rotatably supported by the chassis 17 through a pin 97.

The pinion 92 is fixed to one end of a shaft 98. A gear 99 is fixed to the other end of the shaft 98. The gear 99 engages with a gear 102 which is supported rotatably by a roller supporting lever 100 through a pin 101. The roller supporting lever 100 is rotatably supported by the shaft 98. The gear 102 engages with a gear 104 which is rotatably supported by the supporting lever 100 through a pin 103. A rubber roller 105 is co-axially fixed to the gear 104. The rubber roller 105 serves to withdraw a cassette from the cassette holder or insert another cassette into the cassette holder 9.

Figure 5:
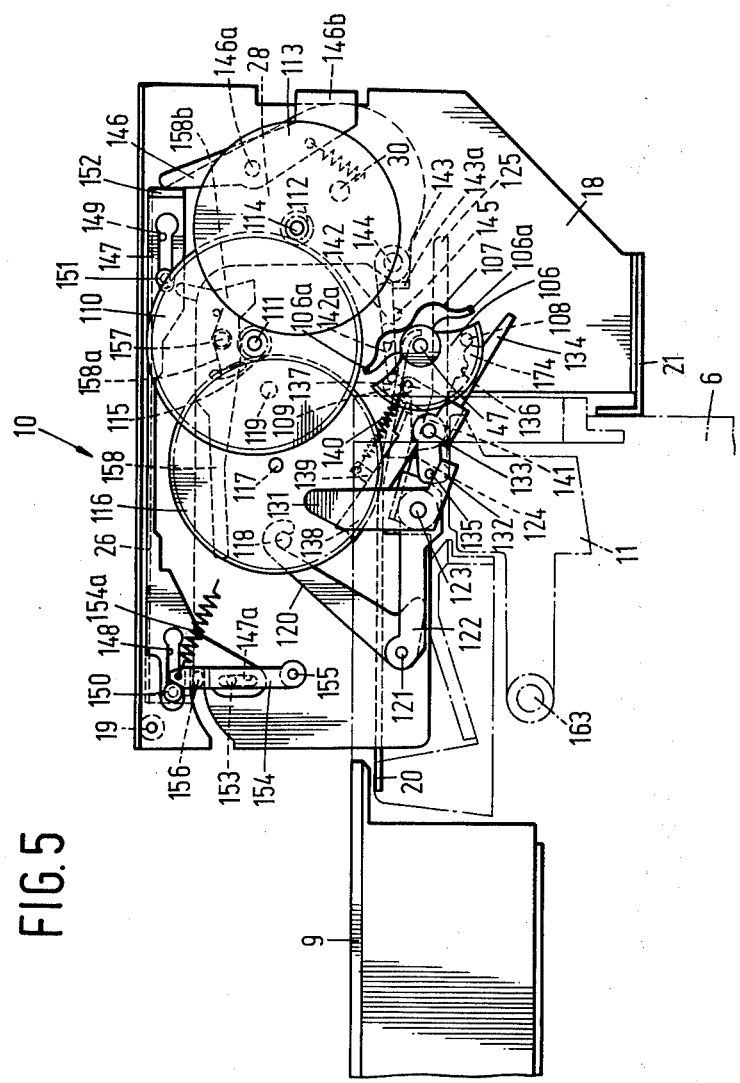
FIG. 5 is a left side view of the cassette changer, the cover of which is removed.

Next, a mechanism in the left side gear box comprising the left side chassis 18 and the cover 23 will be described, mainly with reference to FIG. 5.

The shaft 47, on which the pinion 46 is fixed, penetrates the chassis 17 and 18. A lock gear 106 is fixed on the left end of the shaft 47 and the gear 106 is positioned outside of the chassis 18. A toothless portion 107 is formed in the peripheral surface of the gear 106 in the angle range of about 155°. A pair of pins 108 and 109 are fixed on the gear 106. A gear 110 is arranged to be engagable with a gear 110. The gear 110 is rotatably supported by the chassis 18 through a pin 111.

The gear 106 is made of synthetic resin. A pair of teeth 106a, positioned at the both end of the toothless portion 107, are integrally connected to the gear 106 through respective curved and resilient arms. Accordingly, the teeth 106a can displace both in the circular direction and in the radial direction, when the top of the teeth 106a contacts with the top of the teeth of the gear 110 in accordance with the rotation of the gear 106. In such a manner, the gear 106 engages smoothly with the gear 110.

The gear 110 engages with a pinion 112, which is co-axialy fixed to the fly wheel 113. The pinion 112 and the fly wheel 113 are supported rotatably by the chassis 18 through a pin 114. A pinion 115 is co-axialy fixed to the gear 110. The pinion 115 engages with a drive gear 116. The drive gear 116 is rotatably supported by the chassis 18 through a pin 117. A pair of pins 118 and 119 are fixed on the gear 116, symmetical with each other relative to the pin 117.

The pin 118 fixed on the gear 116 engages with a hook lever 120. The hook lever 120 is connected with an actuating lever 122 through a pin 121. The actuating lever 122 is rotatably supported by a shaft 123. A bent tab 124 of the actuating lever 122 contacts with an upper surface an ejecting plate 125.

The ejecting plate 125 is rotatably supported by the shaft 123 which extend from the left side of the changer to the right side thereof. By the shaft 123, are further supported a rewind plate 126, a stop plate 127, a reproducing plate 128, a fast-forward plate 129 and a recording plate 130. These plates 125, 126, 127, 128, 129 and 130 are corresponding to the above described operating push-buttons 11, 12, 13, 14, 15 and 16. Thereby, one of these push-buttons 11, 12, 13, 14, 15 or 16 is pushed when the corresponding one of these plates 125, 126, 127, 128, 129 or 130 is rotated. Among these plates 125, 126, 127, 128, 129 and 130, the plates 128 and 130 are fixed to the shaft 130 to rotate with the shaft 123, but the other plates 125, 126, 127 and 129 are rotatable relative to the shaft 123.

An actuating lever 131 is fixed on the left-side end of the shaft 123. The lever 131 provides an arm 132 integrally. The arm 132 is positioned to be contactable with a pin 135 which is mounted on a lock lever 134 rotatably supported by a chassis 18 through a pin 133. A lock portin 136 is formed on the lock lever 134. The lock portion 136 is engagable with the pin 108 fixed on the lock gear 106. Further, an arm 137 is formed integrally with the lock lever 134. One end of a spring 140 is engaged with the top of the arm 137. The other end of the spring 140 is engaged with a bent tab 139 of a stop lever 138. The stop lever 138 is rotatably supported with the pin 133. A bent portion 141 of the lever 138 contacts with a lock lever 134.

Next, there will be described a cassette detecting lever 142. A projected portion 143 is formed on the arm 28 of the lid 26. The cassette detecting lever 142 is supported by the projected portion 143 through a pin 144. A pin 145 is fixed on the lever 142. Further, an intermediate lever 146 is rotatably supported by the chassis 18 through a pin 146a. A bent tab 146b is formed on the lever 146, and the tab 146b is contactable with a pin 145 fixed on the detecting lever 142. A cassette detecting slide 147 is arranged on the chassis 18. The front end of the slide 147 contacts with the upper portion of the lever 146. A pair of oblong openings 148 and 149 are defined on the slide 147. A pair of pins 150 and 151 are fit to the oblong openings 148 and 149, whereby the slide 147 is slidably supported by the chassis 18. On the front end of the slide 147, is formed a bent tab 152 which contacts with the lever 146. Further the slide 147 is connected with a cassette supporting lever 154 through an oblong opening 147a defined on the lever 147 and a pin 153 fixed on the lever 154. The lever 154 is rotatably supported by the chassis 18 through a pin 155, and the lever 154 is urged by a spring 154a. A support pin 156 is fixed on the lever 154. The pin 156 supports the rear end of the cassette. Further, a cassette supporting lever 158 is rotatably supported by the chassis 18 through a pin 157. The lever 158 is symmetrical with the lever 74.

Next, it will be described an operation of the cassette changer 10 constructed as described above.

First, the lid 26 is opened to put the second cassette 162 on the cassette changer 10 as shown in FIG. 6. The lid 26 is rotated round the pins 29 and 30 counterclockwise in FIG. 6 relative to the chassis 17 and 18, and the U-shaped cut-out portion 33 formed on the arm 27 of the lid 26 engages with the pin 65 fixed at the end of the charging slide 62 so that the lid 26 is horizontally opened.

When the lid 26 is opened, the pin 34, which is fixed on the arm 27 and supports the hook lever 36, rotates round the pin 29 by 180°. Thereby the rhombus lever 38, engaged with the hook lever 36 through a lock pin 39, rotates round the pin 40 counter-clockwise in FIG. 6 against the fifth spring 5. Accordingly, the spring 5 is expanded and the spring 5 is charged with elastic energy.

The large segment gear 44, connected with the lever 38 through the first spring 1, begins to rotate round the pin 40, in accordance with the rotation of the rhombus lever 38. When the large segment gear 44 rotates by a small angle $\theta_1$ in FIG. 6, the pinion 46 engaged with the large segment gear 44 rotates counter-clockwise. The rotation of the pinion 46 is transmitted to the lock gear 106 through the shaft 47, and the lock gear 106 rotates clockwise by a small angle $\theta_2$ in FIG. 7. Then, the pin 108 of the gear 106 engages with the lock portion 136 of the lock lever 134, and further rotation of the gear 106 is prevented. Accordingly, the pinion 46 connected with the gear 106 through the shaft 47 is locked, and further rotation of the large segment gear 44, engaged with the pinion 46 is prevented. Thereby, the first spring 1 is expanded by the rotation of the rhombus lever 38 and the spring 1 is charged with the elastic energy.

Figure 22:
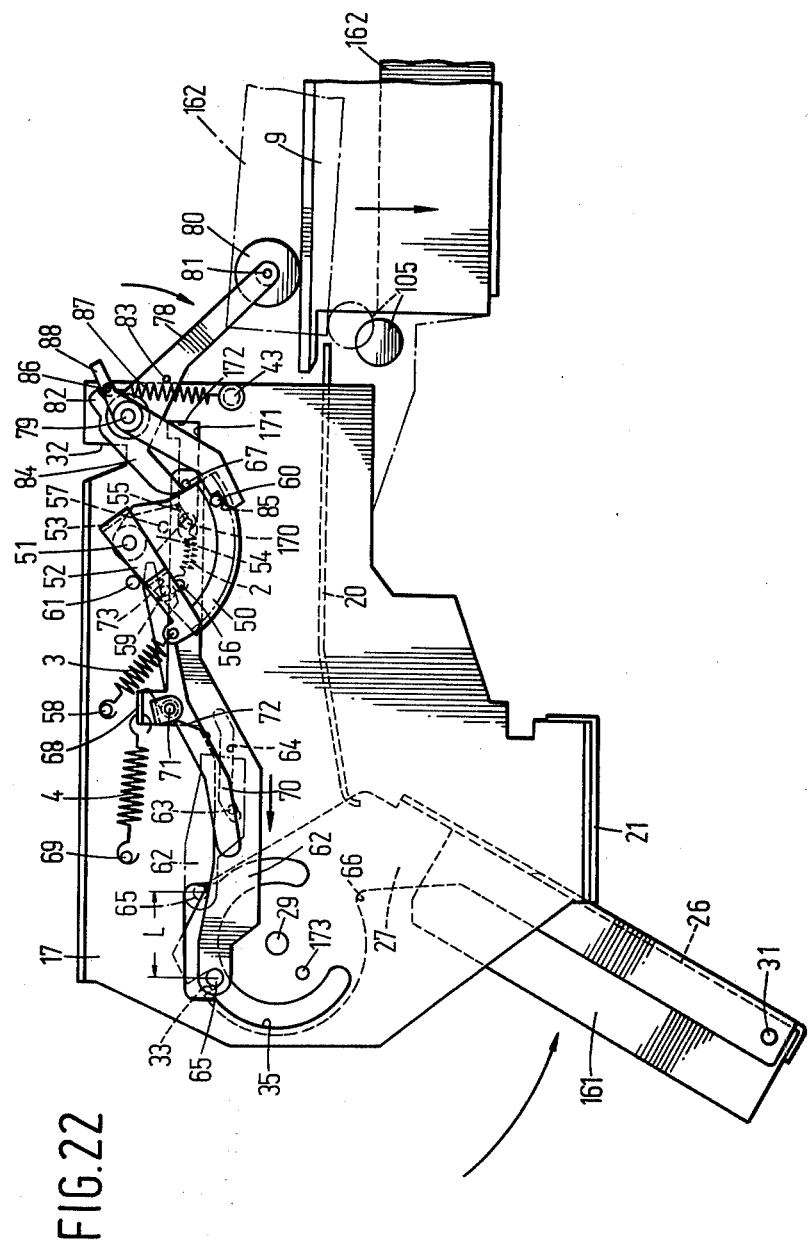
FIG. 22 is a right side view of the cassette changer, when a cassette holder 9 is pushed and moved downward.

In this stage, the second spring 2, the third spring 3 and the fourth spring 4 are also extended and are charged with elastic energy. Charging of elastic energy of the springs 2, 3 and 4 is achieved by closing the lid 26 when elastic energy of the springs 2, 3 and 4 is discharged and the springs 2, 3 and 4 are relaxed, as shown in FIG. 22. That is, when the lid 26 is closed (from the state shown in FIG. 22 to the state shown in FIG. 4), the pin 65 of the charging slide 62 is pushed by the arm 27 of the lid 26, and is displaced to the right by the stroke L in FIG. 22. Then, the fourth spring 4, engaged directly with the projected tab 68, is expanded and elastic energy is stored.

Further, the lock lever 70 connected to the slide 62 through the pin 71 moves right in accordance with the movement of the slide 62. The lock portion 73 of the lever 70 pushes the lock pin 59 and rotates the supporting lever 52 counter-clockwise round the pin 51 in FIG. 22. Then, the third spring 3, engaged with the top of the lever 52, is extended and the spring 3 is charged with the elastic energy. At the same time, the second spring 2, one end of which is engaged with the small segment gear 50, locked by the lock lever 84 through the pin 56, is expanded by the arm 54 of the lever 52 in accordance with the rotation of the supporting lever 52, and the spring 2 is also charged with elastic energy.

As mentioned above, the five springs 1, 2, 3, 4 and 5 are expanded and elastic energy is stored in these springs, by closing and opening the lid 26. The consective operations of the cassette changer 10 are performed with the discharge of the springs 1, 2, 3, 4 and 5 in turn.

Further, in accordance with the opening movement of the lid 26, the cassette detecting lever 142, which is supported by the arm 28 of the lid 26 through the pin 144 as shown in FIG. 7, is pushed by the bent tab 143a, formed on the projected portion 143 of the arm 28, and rotates clockwise round the pin 144 in FIG. 7. Further, on the rotation of the detecting lever 142, the shoulder portion 142a of the lever 142 contacts with the projected portion 158b formed on the cassette supporting lever 158 which is urged clockwise round the pin 157 in FIG. 7 by the torsion spring 158a. In such a way, the detecting lever 142 receives a force to rotate itself clockwise round the pin 144, when the lever separates from the projected portion 158b. Then, the lever 142 rotates about the pin 144, prior to the rotation of the lid 26. Thus, the pin 145 of the detecting lever 142 is surely positioned just to the left side of the bent tab 146b of the intermediate lever 146, so that the lever can detect the cassette 161 as shown in FIG. 7.

In this stage, the second cassette 162, all magnetic tape of which is wound on the supply reel, is put on the cassette changer 10. The cassette 162 is horizontally supported by the cassette supporting lever 74, the cassette supporting lever 158 and the pin 156 of the cassette supporting lever 154.

The first cassette 161 is in the cassette holder 9 of the V.T.R. apparatus, and the cassette holder 9 is in the lower or operative position. The cassette 161 is located in the recording and/or play-back position of the V.T.R. apparatus. The reproducing push-button 14 and the recording push-button 16 are pushed, whereby the V.T.R. apparatus is changed over from the stop mode to the recording mode. Video signals and audio signals are recorded on the magnetic tape of the cassette 161. The reproducing plate 128 and the recording plate 130 positioned respectively on the reproducing push-button 14, and the recording push-button 16 are rotated clockwise in FIG. 7 with the shaft 123 when the reproducing push-button 14 and the recording push-button 16 are depressed.

Figure 8:
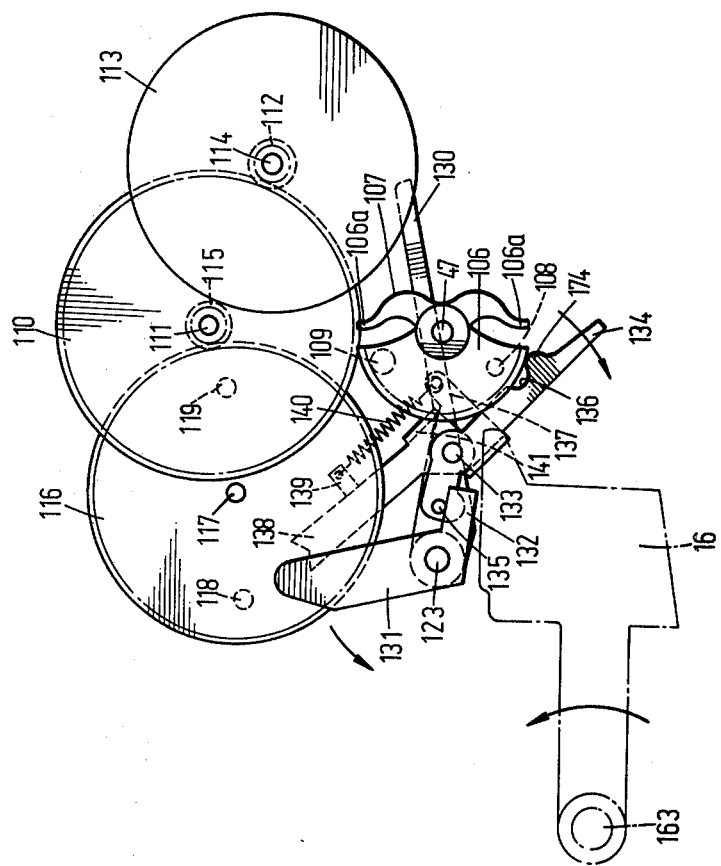
FIG. 8 is a left side view of the cassette changer, wherein a recording push-button 16 is restored to the original position.

In the above mentioned condition, tape end of the magnetic tape is detected, when all magnetic tape of the tape cassette 161 is wound on the take-up reel. Then, the reproducing push-button 14 and the recording push-button 16 are restored to the original position. That is, the reproducing push-button 14 and the recording push-button 16 rotates counter-clockwise about the shaft 163 in FIG. 8. Then, these push-buttons 14 and 16 push the plates 128 and 130. As the restoring movements of the push-buttons 14 and 16 are very quick, the plates 128 and 130 rotate to the upper position rather than horizontal position due to inertia of the respective plates. Thereby the shaft 123 is rotated counter-clockwise in FIG. 8 in accordance with the rotation of the plates 128 and 130 because the plates 128 and 130 are fixed to the shaft 123. Then, the actuating lever 131, fixed to the shaft 123, rotates counter-clockwise. The arm 132 of the lever 131 pushes the pin 135 of the lock lever 134. Thus, the lock lever 134 rotates clockwise about the pin 133 in FIG. 8, and the lock portion 136 of the lever 134 disengages from the pin 108 of the gear 106. Thus, the lock of the gear 106 is released.

As mentioned above, the release of the lock of the lock gear 106 is achieved wih over-stroke movement of the plates 128 and 130 as a result of the inertia. Therefore, the lock gear 106 is locked even when the reproducing push-button 14 and the recording push-button 16 are in the restored position.

Figure 9:
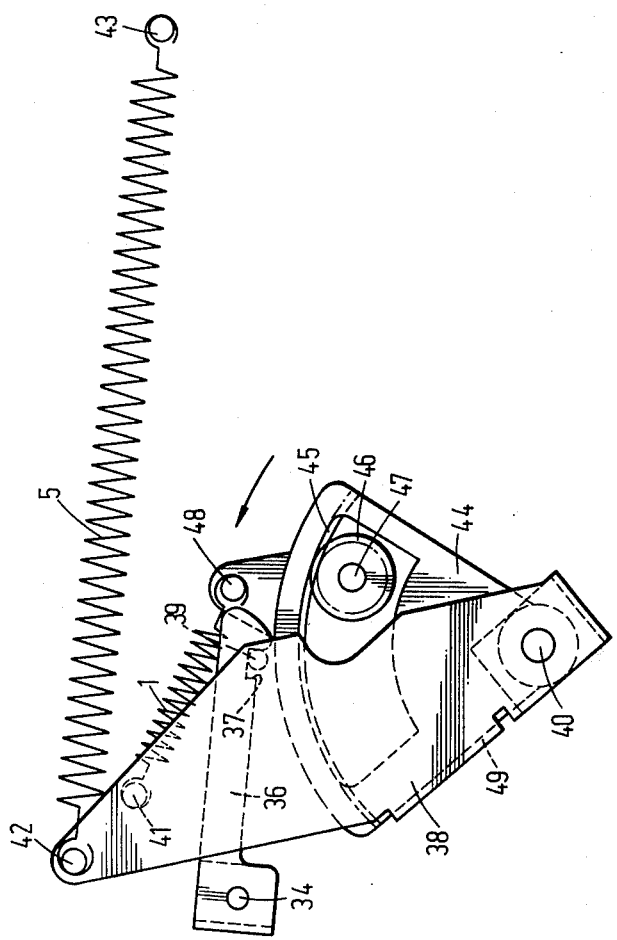
FIG. 9 is a right side view of the cassette changer, when a first spring 1 is discharged.

When the lock of the lock gear 106 is released, the rotation of the pinion 46, connected with the gear 106 through the shaft 47, becomes free. Accordingly, the large segment gear 44, engaged with the pinion 46, rotates counter-clockwise about the pin 40 in FIG. 9 by the first spring 1. The large segment gear 44 rotates until the side portion of the gear 44 contacts with the bent tab 49 of the rhombus lever 38. Thus, the first spring 1 discharges its elastic energy. Powered by the discharged energy, the pinion 46 engaged with the large segment gear 44, rotates counter-clockwise.

Figure 10:
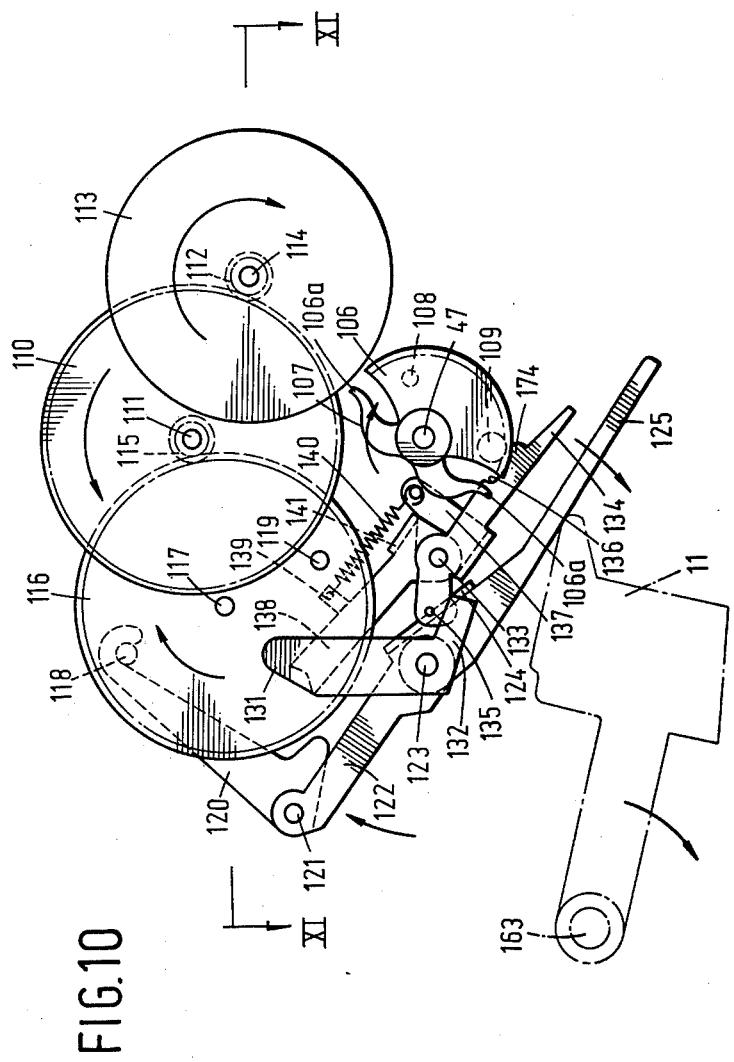
FIG. 10 is a left side view of the cassette changer, showing the pushing operation of an ejecting push-button 11.

The rotation of the pinion 46 is transmitted to the lock gear 106 through the shaft 47, and the lock gear 106 rotates clockwise about the shaft 47 in FIG. 10. As the lock gear 106 is already engaged with the gear 110, the gear 110 rotates counter-clockwise. The rotation of the gear 110 is transmitted to the fly wheel 113 through the pinion 112, and the fly wheel 113 rotates clockwise round the pin 114 in FIG. 10. When the lock gear 106 rotates by about 180°, the toothless portion 107 of the gear 106 faces with the gear 110 as shown in FIG. 10. Thereby, the lock gear 106 disengages from the gear 110. Thus, elastic energy discharged from the spring 1 is transmitted to the fly wheel 113, and is transduced to the kinetic energy of the fly wheel 113.

Figure 11:
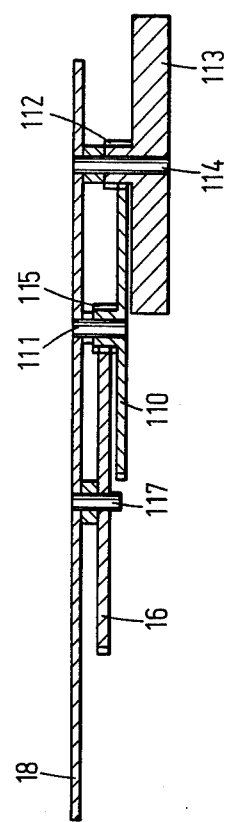
FIG. 11 is a cross-sectional view taken along the line XI — XI in FIG. 10.

The kinetic energy of the fly wheel 113 is transmitted to the gear 116 through the pinion 112, gear 110 and the pinion 115 as shown in FIG. 11. The gear 116 rotates clockwise round the pin 117 in FIG. 10. Then, the pin 118 fixed to the gear 116 moves about the pin 117 engaging with the hook lever 118. Thus, the actuating lever 122, connected to the hook lever 120 through the pin 121, rotates clockwise about the shaft 123 in FIG. 10. Then, the bent tab 124 of the lever 122 pushes the ejecting plate 125, and rotates the plate 125 clockwise about the shaft 123. Thereby, the ejecting plate 125 pushes the ejecting push-button 11 provided on the V.T.R. apparatus. Then the ejecting push-button 11 rotates clockwise about the shaft 163.

By the automatic pushing operation of the ejecting push-button 11, the magnetic tape, withdrawn out of the cassette 161 and loaded on the predetermined path of the V.T.R. is wound on the reels of the cassette and the magnetic tape is unloaded. Then, the lock of the cassette holder 9 is released and the cassette holder 9 moves upwards. In this way, the cassette 161 is separated from the recording and/or reproducing position to the eject position.

When the drive gear 116 rotates clockwise engaging with the hook lever 120, the actuating lever 122 engaged with the hook lever 120, and the ejecting plate 125, both made of synthetic resin, are deflected. Accordingly, when the pin 118 of the gear 116 displaced to the position shown in FIG. 10, the pin 118 is drawn through the hook lever 120 by the resilient force of the actuating lever 122 and the ejecting plate 125, and the gear 116 rotates counter-clockwise in FIG. 12. Accordingly the actuating lever 122 rotates counter-clockwise and the ejecting plate 125 contacting with the bent tab 124 of the lever 122 rotates counter-clockwise about the shaft 123. Then, the ejecting push-button 11 is restored to the original position as shown in FIG. 12.

Figure 12:
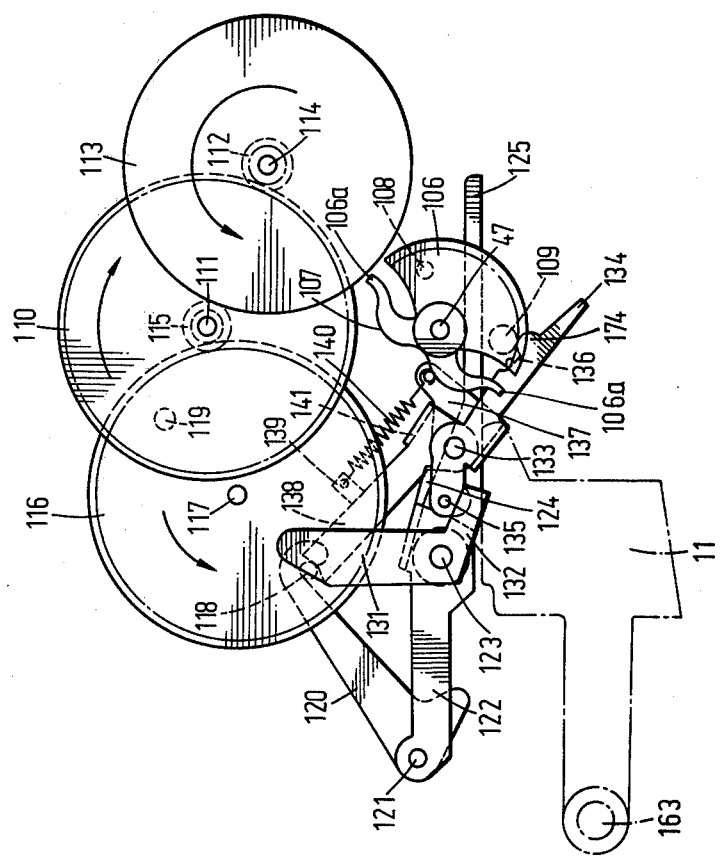
FIG. 12 is a left side view of the cassette changer, showing a reversal movement of a drive gear 116.

As the pin 109 of the lock gear 106 contacts with the projected portion 174 of the lock lever when the gear 116 rotates counter-clockwise as shown in FIG. 12, the top end of the stop lever 138, which is connected with the lever 134 through the spring 140 and the bent portion 141 of the lever 138 which contacts with the arm 137 of the lever 134, is positioned to be able to contact with the pin 118 of the drive gear 116. Accordingly, the drive gear 116 rotates counter-clockwise as far as the pin 118 contacts with the top of the stop lever 138. Thus, as the counter-clockwise rotation of the drive gear 116 is readjusted and the interval from the beginning of the clockwise rotation of the gear 116 to the contacting of the pin 119 with the actuating lever 131 is controlled, as mentioned below, the sufficient time is secured for the loading of the magnetic tape of the second new cassette 162.

Figure 13:
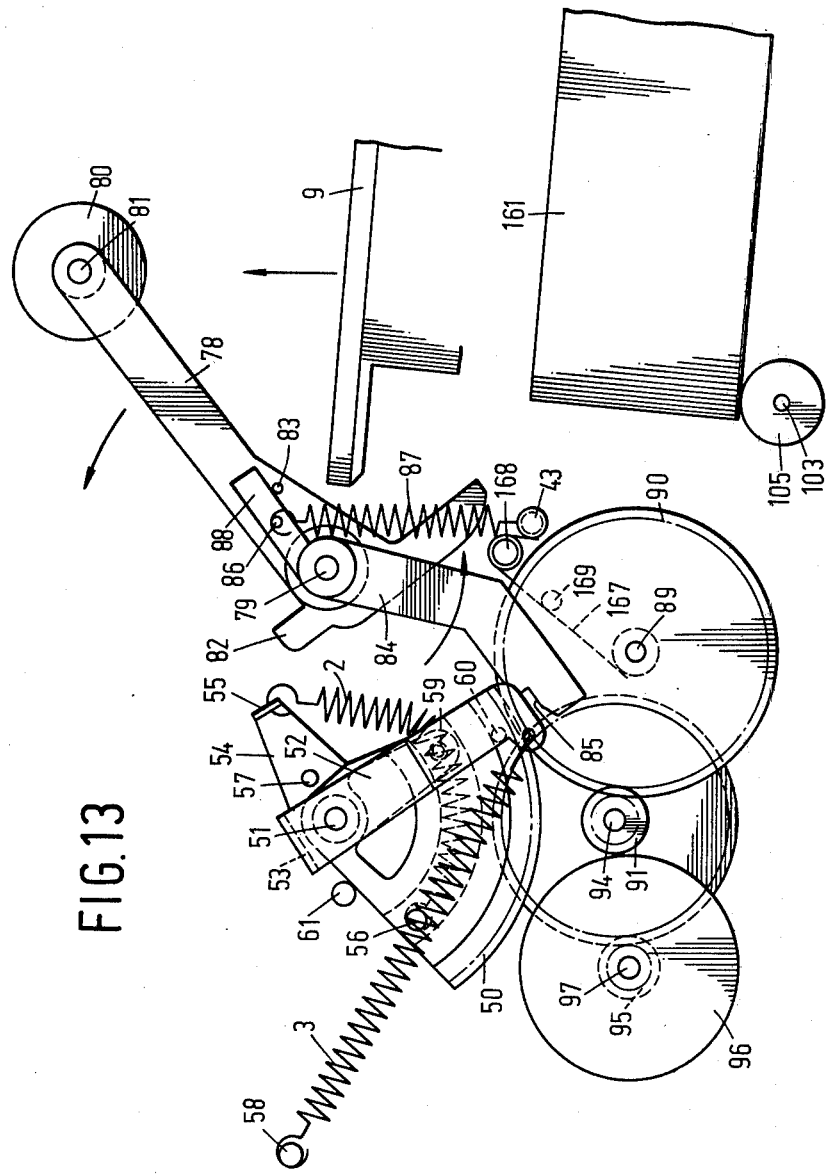
FIG. 13 is a right side view of the cassette changer, showing the release of lock of a small segment gear 50.

The cassette holder 9 moves upwards as shown in FIG. 13 when the ejecting push-button 11 is pushed. Then, the lever 78, which supports the roller 80 contacts with the upper surface of the cassette holder 9, rotates counter-clockwise in FIG. 13 about the pin 79. As the upward movement of the cassette holder 9 is very quick, the angle of the rotational movement of the lever 78 is larger than that corresponding to the upward position of the cassette holder 9, because of the inertia of the level 78. Then, the pin 83 of the lever 78 pushes the arm 88 of the lock lever 84, and the lock lever 84 rotates counter-clockwise in FIG. 13 about the pin 79 against the force of coil spring 87. Thus, the lock portion 85 of the lock lever 84 disengages from the lock pin 60 of the small segment gear 50.

As the release of the lock of the small segment gear 50 is achieved by the over stroke of the lever 78 through inertia, the second spring 2 is charged even when the cassette holder 9 is in the upper position. That is, even when the cassette holder 9 is in the upper position, the pin 60 of the small segment gear 50 and the lock portion 85 of the lock lever 84 can engage with each other.

Figure 14:
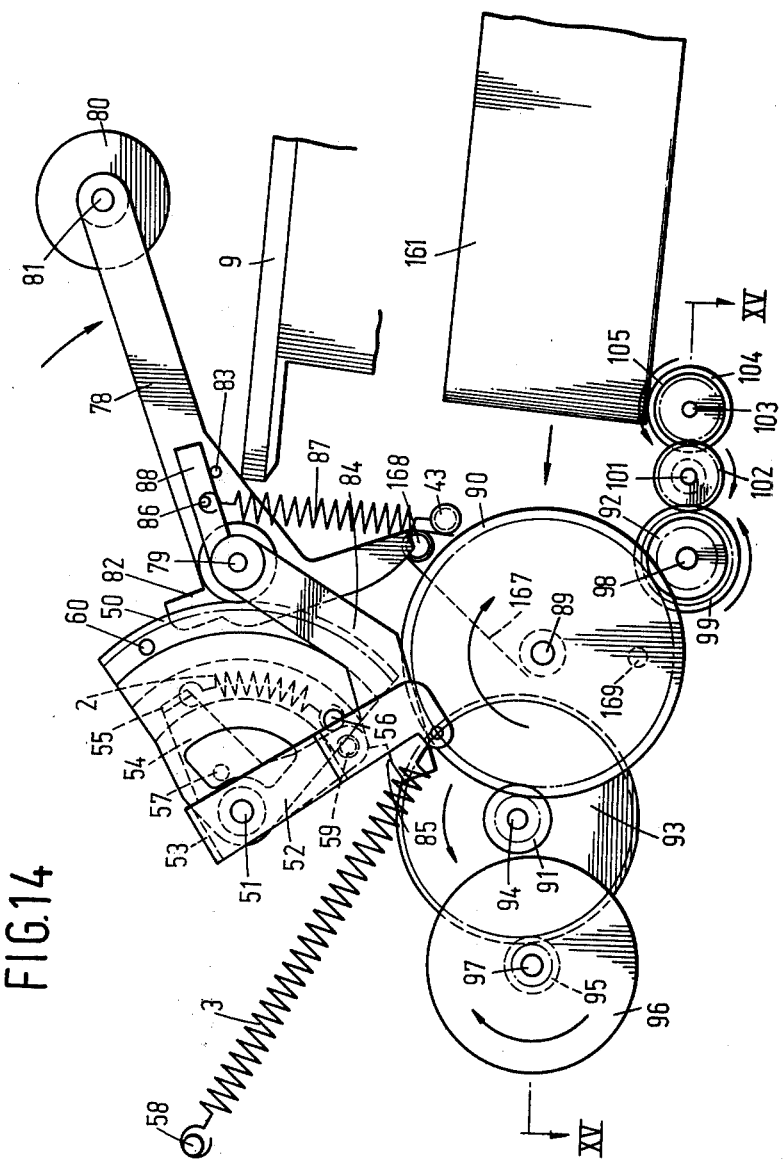
FIG. 14 is a right side view of the cassette changer, when a second spring 2 is discharged.
Figure 15:
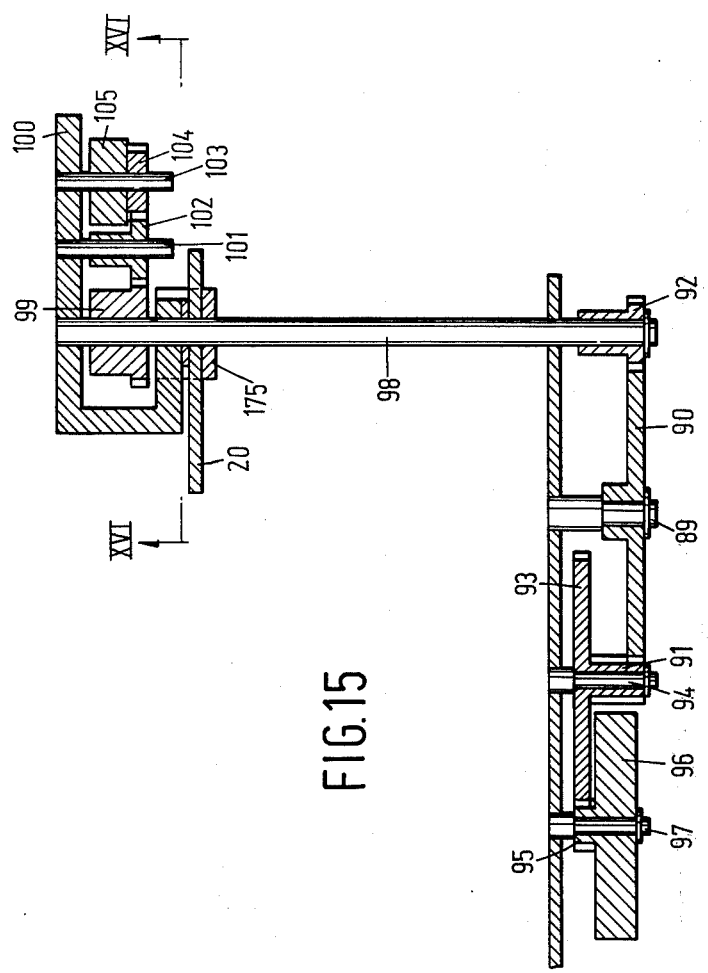
FIG. 15 is a cross-sectional view taken along the line XV — XV in FIG. 14.

When the lock of the small segment gear 50 is released, the small segment gear 50 rotates counter-clockwise in FIG. 14 about the pin 51 by second spring 2. That is, elastic energy stored in the spring 2 is discharged in this portion of the operation, and is transduced to the kinetic energy of the small segment gear 50. The rotation of the small segment gear 50 is transmitted to the gear 90 which engages with the small segment gear 50. Further, the rotation of the gear 90 is transmitted to the rubber roller 105 through the pinion 92, the shaft 98, the gear 99, the gear 102 and the gear 104 as shown in FIG. 15. At the same time, the rotation of the gear 90 is transmitted to the fly wheel 96 through the pinion 91, the gear 93 and the pinion 95, and a part of the elastic energy of the spring 2 is stored as kinetic energy in the fly wheel 96. Accordingly, the rubber roller 105 continues to rotate for a while, after the small segment gear 50 rotates by large angles and disengages from the gear 90 as shown in FIG. 14. In this portion of the operation, the fly wheel 96 functions as a governor to rotate the rubber roller 105 at moderate speed.

Figure 16:
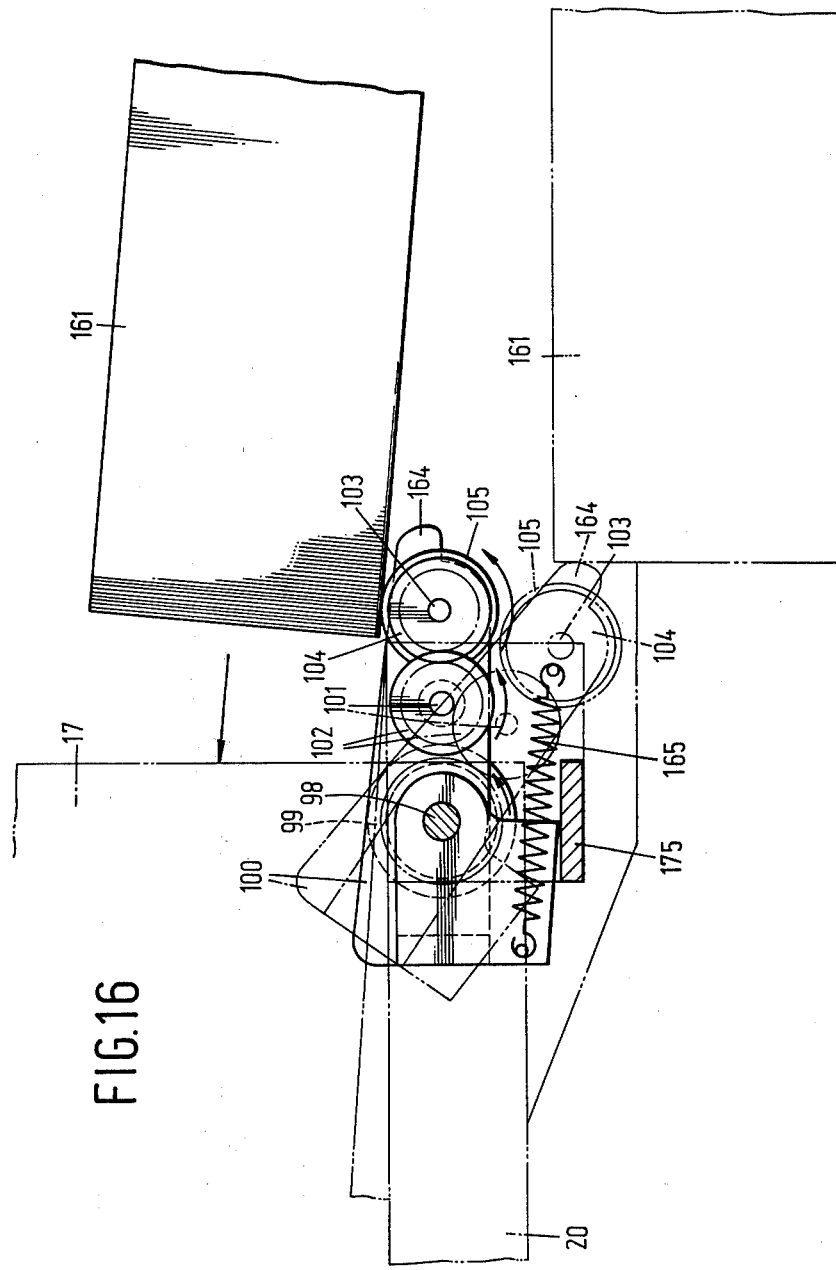
FIG. 16 is a cross-sectional view taken along the line XVI — XVI in FIG. 15.

The top end 164 of the roller supporting lever 100, which supports the rubber roller 105, contacts with the front side of the cassette holder 9 as shown in chain-dot in FIG. 16, when the cassette 161 in the cassette holder 9 is in the recording and/or reproducing position, and the roller 105 does not contact with the cassette 161. But when the cassette holder 9 moves upwards, the lever 100 rotates counter-clockwise in FIG. 16 round the shaft 98 by the spring 165 to contact with the stopper 175. Then, the roller 105 contacts with the bottom surface of the cassette 161.

Figure 17:
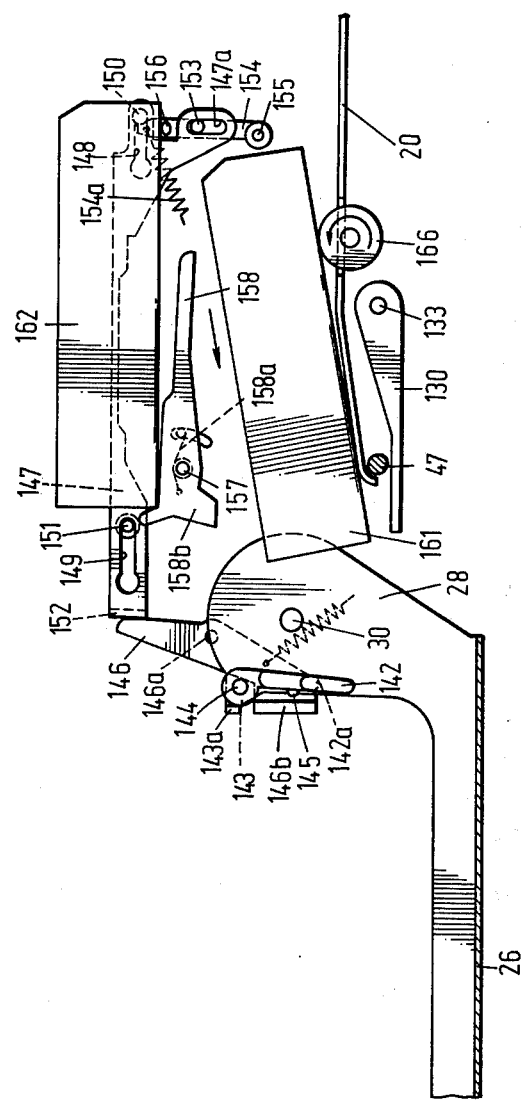
FIG. 17 is a right side view of the cassette changer, when a cassette 161 is withdrawn.

The roller 105 rotates counter-clockwise in FIG. 16 about the pin 103 and the cassette 161 is withdrawn from the cassette holder 9. The cassette 161 withdrawn from the cassette holder 9 moves leftward in FIG. 17 or in the direction of the lid 26, over the roller 166 supported by the intermediate chassis 20 which is arranged between the chassis 17 and 18.

Figure 18:
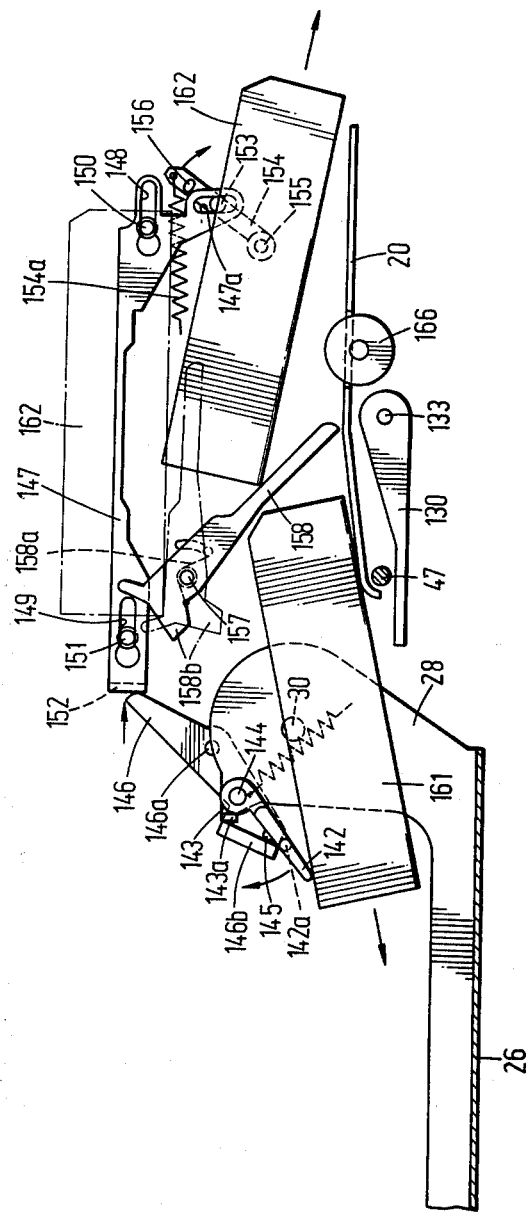
FIG. 18 is a right side view of the cassette changer, when a cassette 162 is dropped.

When the cassette 161 moves leftward as shown in FIG. 18, the front end of the cassette 161 pushes the detecting lever 142 to rotate the latter clockwise about the pin 144 in FIG. 18. Then, the pin 145 of the lever 142 pushes the bent tab 146b of the intermediate lever 146 to rotate the lever 146 clockwise about the pin 146a in FIG. 18. Thereby, the other end of the lever 146 pushes the bent tab 152 of the cassette detecting slide 147 to displace the slide 147 rightward in FIG. 18.

By the displacement of the slide 147, the cassette supporting lever 154, connected with the slide 147 through the oblong opening 147a and the pin 153, rotates clockwise in FIG. 18 about the pin 155, and the supporting pin 156 of the lever 154 is displaced rightward in FIG. 18 is lowered. Accordingly, right side of the cassette 162 in FIG. 18 down, and at the same time, the cassette supporting lever 158, which supports the left side of the cassette 162 in FIG. 18, rotates clockwise about the pin 157.

Figure 19:
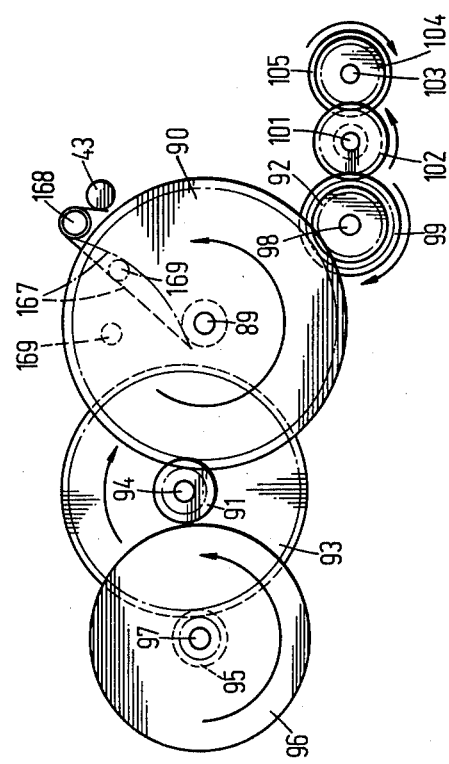
FIG. 19 is a right side view of the cassette changer, showing a reversal movement of a gear 90.

A rod spring 167 is provided near the gear 90 as shown in FIG. 19, one end of the spring 167 is supported by the pin 168 fixed on the chassis 17 and the other end of the spring 167 contacts with the boss of the gear 90. When the cassette 161 is withdrawn by the roller 105, the pin 169, fixed on the side surface of the gear 90, is displaced clockwise round the pin 89 in accordance with the rotation of the gear 90, and the pin 169 contacts with the spring 167. Whereby the spring 167 is transformed into the shape of circular arc as shown in FIG. 19. The kinetic energy of the fly wheel 96 is stored in the spring 167 as elastic energy. When the deformation of the spring 167 becomes large to some extent, the spring 167 pushes the pin 169 by its resilient force and rotates the gear 90 counter-clockwise as in FIG. 19. The counter-clockwise rotation of the gear 90 is transmitted to the rubber roller 105 through the pinion 92, the shaft 98, the gear 99, the gear 102 and the gear 104, and the rubber roller 105 rotates clockwise in FIG. 19. Therefore, the right end of the bottom of the cassette 162, which is lowered from the upper position, contacts with the rubber roller 105 which rotates in such a direction that the roller 105 inserts the cassette 162 into the cassette holder 9.

Figure 20:
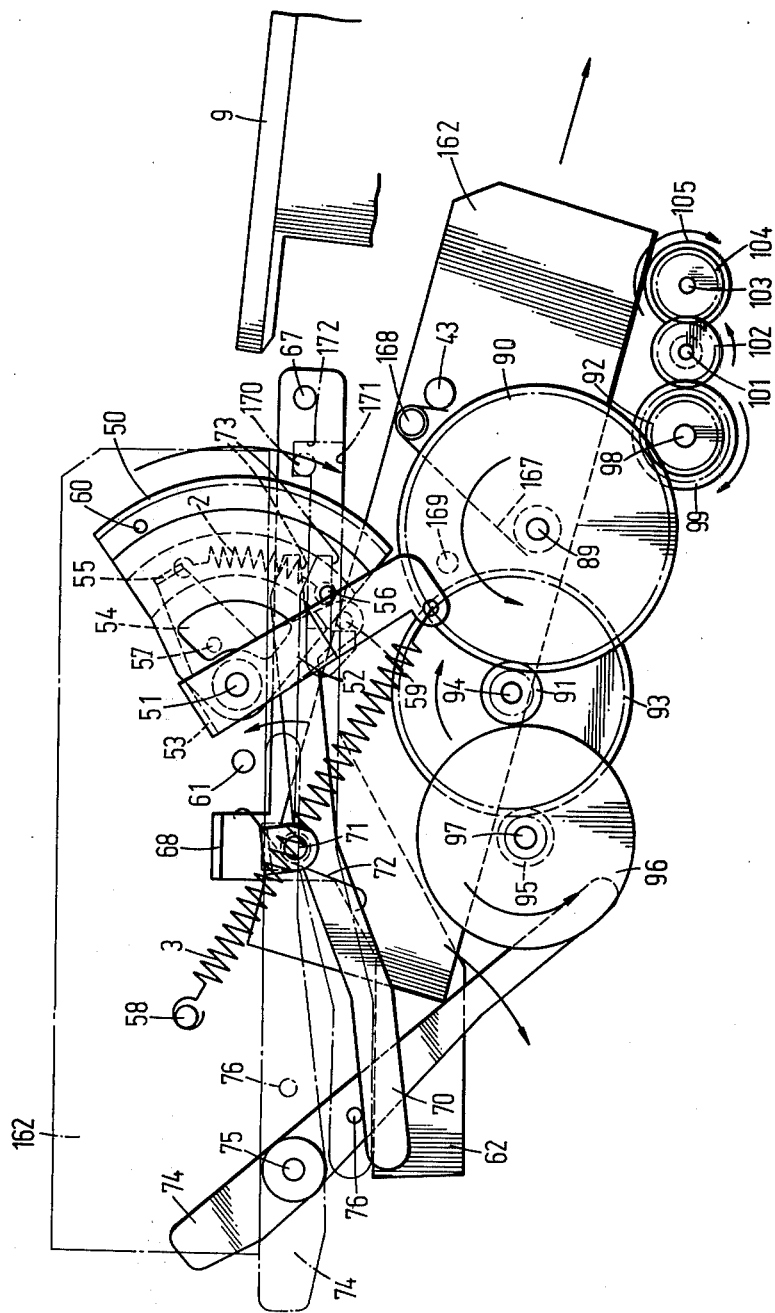
FIG. 20 is a right side view of the cassette changer, showing the release of lock of a supporting lever 52.

When the cassette 162 is lowered from the upper position, the cassette supporting lever 74 rotates clockwise round the pin 75 in FIG. 20, and the pin 76 of the lever 74 pushes the upper surface of the lock lever 70. Accordingly, the lock lever 70 rotates counter-clockwise about the pin 71 as shown in FIG. 20 against the torsion spring 72. Then, the lock portion 73 of the lock lever 70 disengages from the lock pin 59 of the supporting lever 52, and the supporting lever 52 is rotated clockwise about the pin 51 by the third spring 3. As the bent tab 53 of the supporting lever 52 contacts with the side portion of the small segment gear 50, the small segment gear 50 rotates clockwise about the pin 51 in accordance with the rotation of the supporting lever 52. That is, the small segment gear 50 rotates clockwise because of the elastic energy provided by the third spring 3.

When the small segment gear 50 rotates, the gear 50 engages with the gear 90. As the direction of the rotation of the gear 90 was changed by the rod spring 167 and is rotating counter-clockwise, the beginning of the engagement of the gear 90 and the small segment gear 50 is very smooth.

Figure 21:
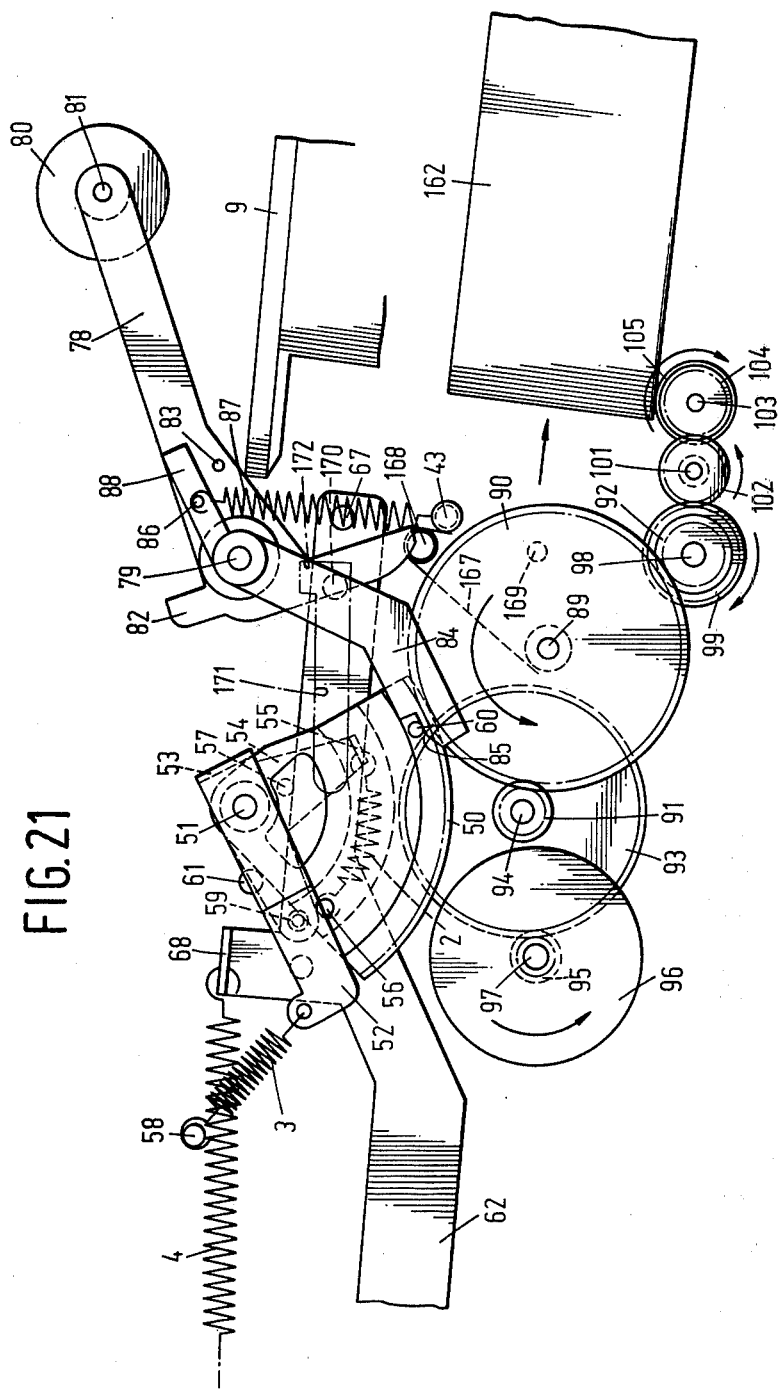
FIG. 21 is a right side view of the cassette changer, when a third spring 3 is discharged.

When the gear 90 is rotated counter-clockwise by the small segment gear 50, the rotation of the gear 90 is transmitted to the rubber roller 105 through the pinion 92, the shaft 98, the gear 99, the gear 102 and the gear 104, and the rubber roller 105 rotates clockwise as shown in FIG. 21. Further, the rubber roller 105 rotates at moderate speed, because the gear 90 is linked to the fly wheel 96 through the pinion 91, the gear 93 and the pinion 95 and the fly wheel 96 functions as a governor. The second cassette 162, lowered from the upper position is inserted into the cassette holder 9 by the rubber roller 105.

In accordance with the above mentioned rotation of the supporting lever 52, the pin 57 of the arm 54 of the lever 52 pushes the upper edge of the changing slide 62. Then, the slide 62 rotates clockwise as shown in FIG. 22 against the fourth spring 4 about the pin 63 which is fitted to the oblong opening 64 of the chassis 17. Thus the pin 170, fixed to the slide 62, disengages from the cut-out portion 172 of the opening 171 of the chassis 17, and the lock of the slide 62 is released. Accordingly, the charging slide 62 moves leftward in FIG. 22 under the influence of the fourth spring 4. That is, the elastic energy of the fourth spring 4 is discharged and is converted to the kinetic energy of the slide 62.

As the pin 65 of the slide 62 engages with the U-shaped cut-out portion 33 of the arm 27 of the lid 26, the lid 26 rotates counter-clockwise, under the influence of gravity on the cassette 161 as shown in FIG. 22, when the ejected first cassette is received in the lid 26 and the charging slide 62 moves leftward in accordance with the rotation of the lid 26. That is, the charging slide 62 moves leftward by the influence of the fourth spring 4 and the weight of the ejected cassette 161.

When the charging slide 62 moves leftward as shown in FIG. 22, the pin 67 of the slide 62 pushes the end of the actuating lever 78 to rotate the lever 78 clockwise round the pin 79. Then, the roller 80, supported at the top of the lever 78 through the pin 81, pushes the upper surface of the cassette holder 9, wherein the second cassette 162 is inserted. Then the cassette holder 9 moves downwards, and the second cassette in the cassette holder 9 is placed in the recording and/or reproducing position in the V.T.R. apparatus.

Figure 23:
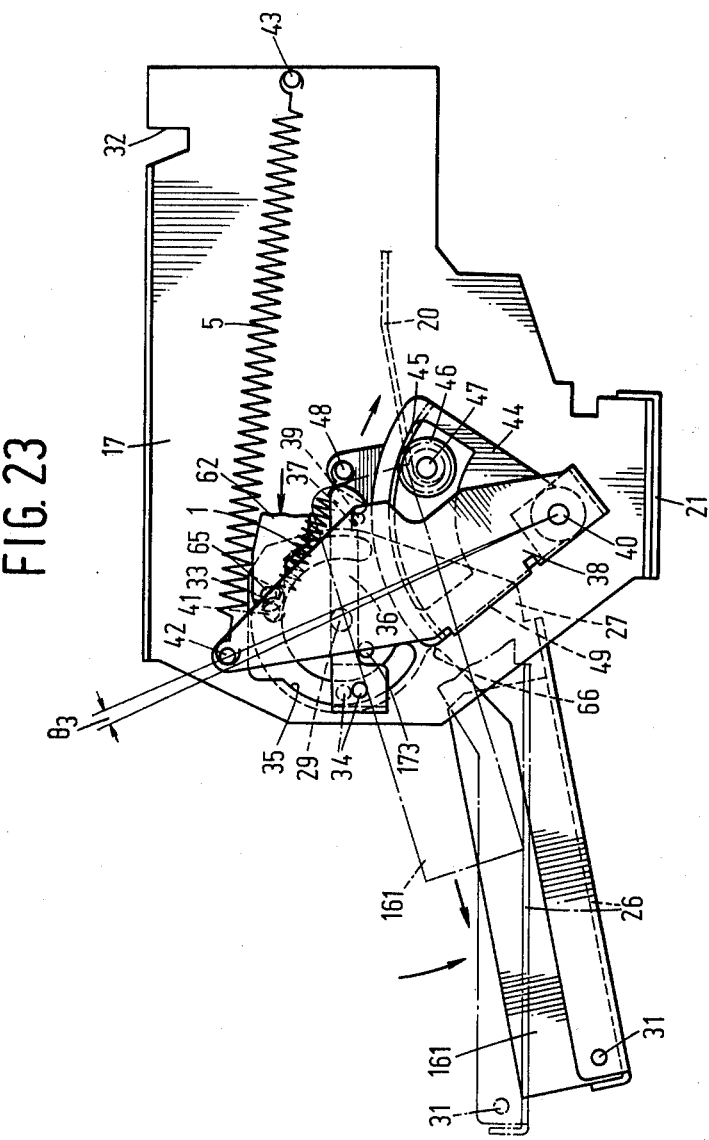
FIG. 23 is a right side view of the cassette changer, when the lid 26 is further rotated by the gravity of the cassette 161.

As mentioned above, the lid 26 is rotated counter-clockwise as shown in FIG. 22 about the pin 29 by the weight of the first cassette 161, when the first cassette 161 is lowered into the lid 26. Then, the pin 34, which is fixed on the arm 27 of the lid 26 and supports the hook lever 36, is displaced rightward in the horizontal direction as shown in FIG. 23. As a result of the foregoing, the hook lever 36 is connected with the pin 39 of the rhombus lever 38, and the rhombus lever 38 rotates clockwise as shown in FIG. 23 round the pin 40 by an angle $\theta_3$ through the fifth spring 5. Then, the large segment gear 44 rotates clockwise about the pin 40 by the angle of $\theta_3$, because the side portion of the large segment gear 44 contacts with the bent tab 49 of the rhombus lever 38.

Figure 24:
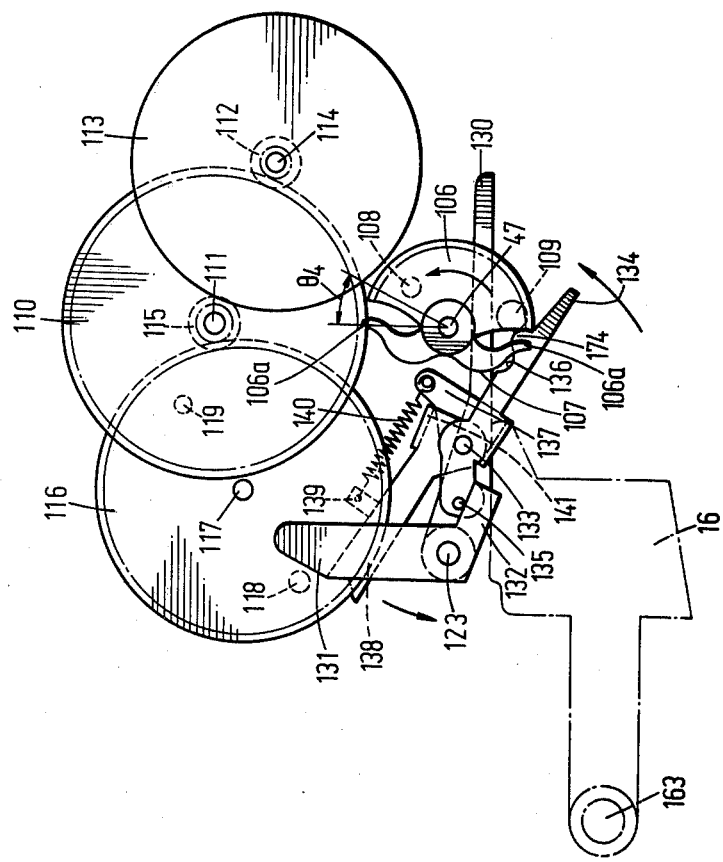
FIG. 24 is a left side view of the cassette changer, when a lock gear 106 engages with a ger 110.

Then, the pinion 46, which engages with the large segment gear 44, rotates clockwise as shown in FIG. 23. The rotation of the pinion 44 is transmitted to the lock gear 106 through the shaft 47, and the lock gear 106 rotates counter-clockwise in FIG. 24 about the axis of the shaft 47 by an angle $\theta_4$. Then, the toothless portion 107 of the lock gear 106 moves from the position where the toothless portion 107 confronts the gear 110 to prevent the engagement of the lock gear 106 and the gear 110, and, the lock gear 106 engages with the gear 110.

Figure 25:
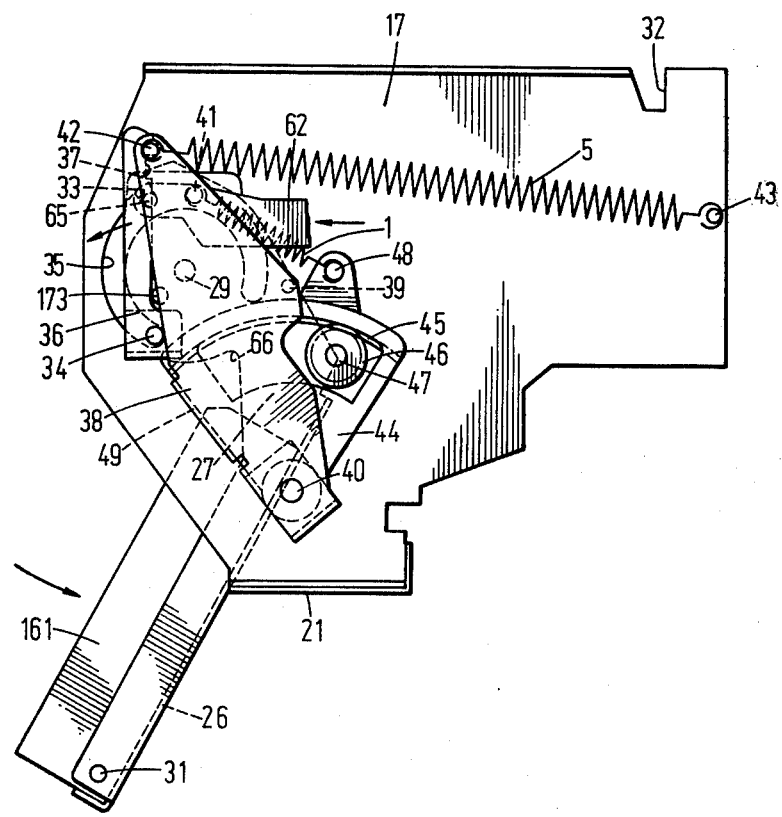
FIG. 25 is a right side view of the cassette changer, when the lid 26 rotated further more.

When the lid 26 further rotates counter-clockwise as shown in FIG. 25 about the pin 29 by the weight of the cassette 161 in this situation, the pin 34 fixed on the arm 27 of the lid 26 displaces further. Accordingly, the hook lever 36 is pushed by the pin 173 fixed on the chassis 17, and the hook lever 36 rotates counter-clockwise about the pin 34 as shown in FIG. 25. As a result, the hook portion 37 of the hook lever 36 disengages from the pin 39 of the rhombus lever 38, and the lock of the rhombus gear 38 is released.

Figure 26:
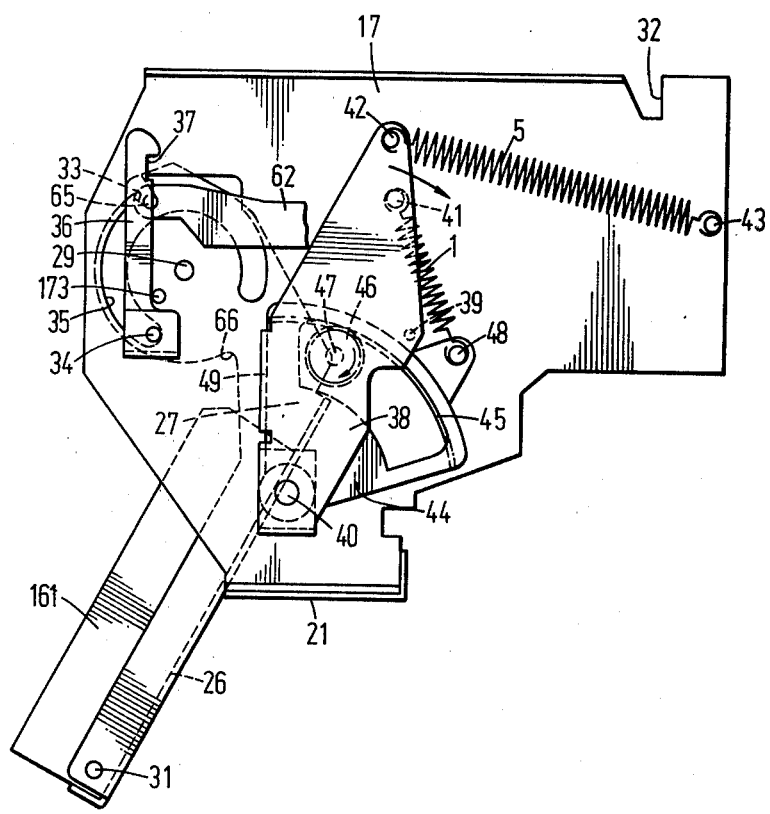
FIG. 26 is a right side view of the cassette changer, when a fifth spring 5 is discharged.

Therefore, the rhombus lever 38 rotates clockwise as shown in FIG. 26 about the pin 40 by the influence of the fifth spring 5. That is, the elastic energy of the fifth spring 5 is discharged in this portion of the operation. When the rhombus lever 38 rotates, the bent tab 49 of the lever 38 pushes the large segment gear 44 to rotate the large segment gear 44 clockwise about the pin 40 as shown in FIG. 26. As the pinion 46 engages with the internal gear 45 of the large segment gear 44, the pinion 46 rotates, and the rotation of the pinion 46 is transmitted to the lock gear 106 through the shaft 47. Then the lock gear 106 rotates counter-clockwise as shown in FIG. 27.

The rotation of the lock gear 106 is transmitted to the fly wheel 113 through the gear 110 and the pinion 112. The fly wheel 113 rotates about the pin 114. That is, the elastic energy of the fifth spring 5 is converted to the kinetic energy of the fly wheel 113. Therefore, the fly wheel 113 continues to rotate, after the gear 110 disengages from the lock gear 106.

Figure 27:
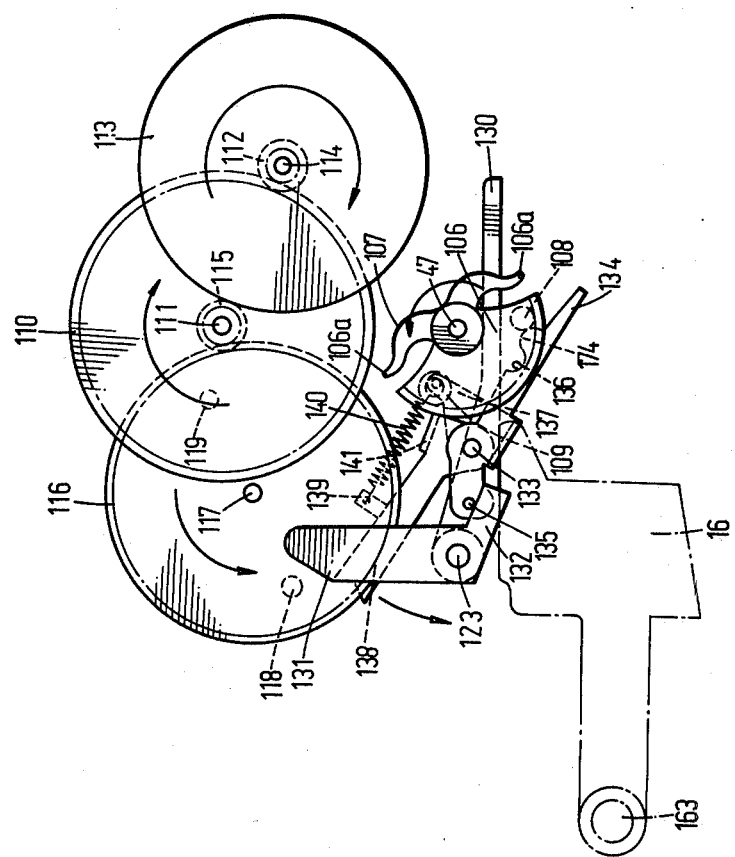
FIG. 27 is a left side view of the cassette changer, when a drive gear 116 is in rotation.
Figure 28:
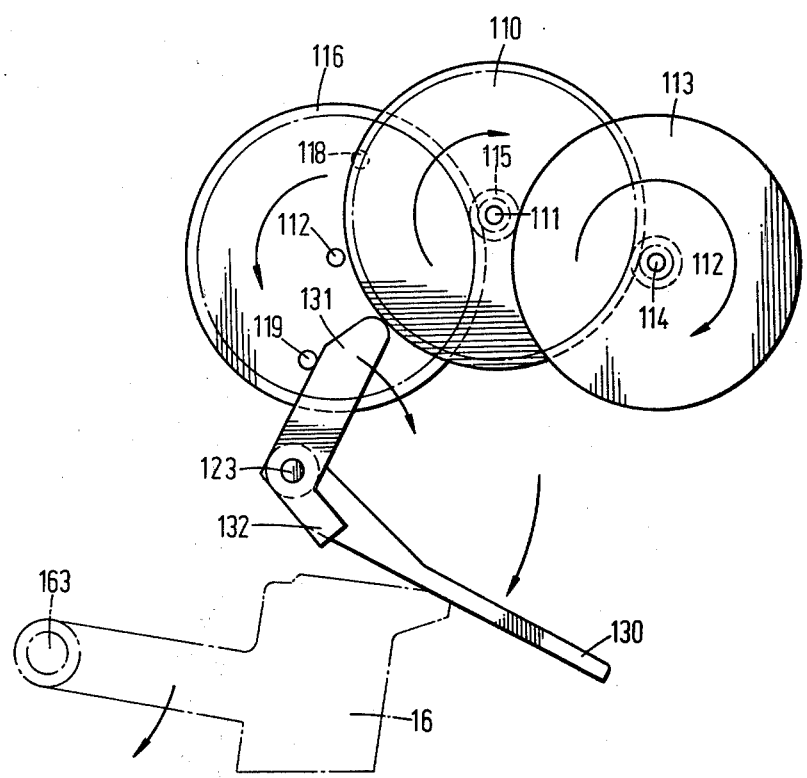
FIG. 28 is a left side view of the cassette changer, when a recording push-button is pushed.

The rotation of the fly wheel 113 is transmitted to the drive gear 116 through the pinion 112, the gear 110 and the pinion 115, and the drive gear 116 rotates counter-clockwise as shown in FIG. 27 about the pin 117. Then, the pin 119 of the gear 116 pushes the actuating lever 131 to rotate the lever 131 clockwise as shown in FIG. 28 about the shaft 123. As the lever 131 is fixed to the shaft 123, and as the reproducing plate 128 and the recording plate 130 are fixed to the shaft 123, the reproducing plate 128 and the recording plate 130 rotate clockwise about the axis of the shaft 123 in accordance with the rotation of the actuating lever 131. Thus the reproducing push-button 14 and the recording push-button 16 are pushed by the reproducing plate 128 and the recording plate 130 respectively, and the V.T.R. apparatus is changed over to the recording mode. In this way continuous recording is performed on the magnetic tape of the second cassette 162.

Before the recording push button 16 and the reproducing push-button 14 are pushed, the pin 118 of the gear 116 contacts with the stop lever 138 to prevent the gear 116 from rotating counter-clockwise as shown in FIG. 27. Therefore, the drive gear 116 rotates at least by 180° before the pin 119 of the drive gear 116 contacts with the actuating lever 131. Further, the fly wheel 113 functions as a govenor, and the rotation of the fly wheel 113 is retarded by the gear train comprising the pinion 112, the gear 110, the pinion 115 and the gear 116. Therefore, the drive gear 116 rotates at moderate speed, and the sufficient times are secured for drawing the magnetic tape from the second cassette 162 settled in the V.T.R. apparatus and loading the tape on the predetermined tape path of the V.T.R. apparatus. After the tape is loaded on the tape path, the recording push-button 16 and the reproducing push-button 14 are pushed.

The pin 109 of the lock gear 106 is separated from the projected portion 174 of the lock lever 134, when the drive gear 116 rotates. Then, the arm 137 of the lever 134 pushes the bent portion 141 of the stop lever 138. Accordingly, the stop lever 138 rotates counter-clockwise as shown in FIG. 27 about the pin 133, and the top of the lever 138 displaced outside in the radial direction of the drive gear 116. Therefore, the stop lever 138 does not prevent the rotation of the gear 116.

As mentioned above, this cassette changer 10 exchanges the first cassette 161 for the second cassette 162 automatically in accordance with the end of play of the first cassette 161, and the recording is performed continuously. Accordingly, continuous recording is achieved for the length of time corresponding to the twice of the tape length of the tape cassette without any interviewing operation by the operator. When the operator is absent, the recording is performed for 120 minutes with 60 minute cassettes. Further, continual exchanging of the cassette can be performed, by placing the second cassette on the cassette changer when the first cassette is under recording, placing the third cassette on the cassette changer when the first cassette has been exchanged for the second cassette and the second cassette is under recording, and similarly placing fourth and further cassettes on the cassette changer.

In the above mentioned operation, the cassettes are exchanged in accordance with the restoring movement of the recording push-buttton 16 and the reproducing push-buttons 14 by the detecting of the end of play of the first cassette 161 through the shut-off mechanism. That is, the restoring movement of the push-buttons functions as a trigger for exchanging cassettes. But an operator can manually restore the recording push-button 16 and the reproducing push-button 14 by pushing the stop push-button 13 when the first cassette is under recording. That is, the manual restoring movement also functions as a trigger for exchanging cassettes. In this operation, the first cassette can be exchanged for the second cassette when the magnetic tape of the first cassette is only recorded half way.

Although an illustrative embodiment of this invention has been described in detail herein with reference to the accompanying drawings, it is to be understood that the invention is not limited to this precise embodiment, and that various changes and modifications may be effected therein by one skilled in the art without departing from the scope or spirit of the invention as defined in the appended claims.

For instance, although the above described embodiment relates to a cassette changer for the V.T.R. apparatus, this invention can be applied to the cassette changer for other apparatus, for example, for an audio tape recorder.

What is claimed is:

1. A cassette changer for exchanging cassettes automatically in a cassette recording and/or reproducing apparatus in which an operating mode selector is moved from a first position to a second position to effect a recording or reproducing operation and said selector is returned to said first position at the end of said operation, and in which a cassette holder for holding a first cassette is movable between a recording or reproducing position and an eject position and is movable to said eject position in response to selection of an eject mode: said cassette changer comprising a plurality of resilient members; cassette loading means for receiving a second cassette; means for charging each of said resilient members with elastic energy when said second cassette is loaded in said loading means of the changer; and means driven by elastic energy discharged from said resilient members in order starting in response to the return of said operating mode selector to said first position for exchanging said second cassette for said first cassette in the cassette holder and then restoring said operating mode selector to said second position for continuing said recording or reproducing operation with said second cassette.

2. A cassette changer according to claim 1, in which there are at least five of said resilient members, said eject mode is selected by the discharge of elastic energy from a first of the resilient members; the first cassette is withdrawn from said holder by the discharge of elastic energy from a second of the resilient members; the second cassette is inserted into the cassette holder by the discharge of elastic energy from a third of the resilient members; the second cassette held in the cassette holder is moved to the recording or reproduction position by the discharge of elastic energy from a fourth of the resilient members; and said operating mode selector is moved to said second position by the discharge of elastic energy from a fifth of the resilient members.

3. A cassette changer according to claim 2, further comprising a lid member rotatable from a closed position to an open position for receiving the first cassette upon withdrawal of the latter from said holder; and wherein said means for charging said resilient members with elastic energy includes means for deflecting said five resilient members to respective deflected positions in response to rotation of said lid member between said open and closed positions thereof whereby elastic energy is stored in said resilient members.

4. A cassette changer according to claim 3, wherein said first resilient member is released from the respective deflected position in accordance with the return movement of said operating mode selector to said first position, said second resilient member is released from the respective deflected position thereof in accordance with the movement of said cassette holder into the eject position, said third resilient member is released from the respective deflected position thereof in accordance with the withdrawing of the first cassette from said cassette holder, said fourth resilient member is released from the respective deflected position thereof in accordance with the insertion of the second cassette into said cassette holder, and said fifth resilient member is released from the respective deflected position thereof in response to the reception of said exchanged first cassette by said lid member.

5. A cassette changer according to claim 4, wherein said lid member with said exchanged first cassette therein is subjected to further displacement under the influence of gravity; and further comprising an operating member moving said operating mode selector to said second position, so that said recording and/or reproducing apparatus is changed over to the recording or reproducing mode in response to said further gravitational displacement of the lid member.

6. A cassette changer according to claim 4, further including a displacable recording or reproducing plate contactable with said operating mode selector so that said plate is displaced by the return of said operating mode selector to said first position, said plate occupying a normal position when said operating mode selector is in said first position and being displacable away from said operating mode selector beyond said normal position upon movement of said operating mode selector to said first position, wherein said first resilient member is released when said recording or reproducing plate is displaced beyond said normal position, and said resilient member is not released when said recording or reproducing plate is displaced only a small amount or remains in the normal position thereof.

7. A cassette changer according to claim 4, further including an actuating lever contactable with said cassette holder and rotatable in response to movement of said cassette holder into said eject position, wherein said movement of the cassette holder causes said actuating lever to rotate beyond the position at which the actuating lever contacts said cassette holder in the eject position, and wherein said second resilient member is released and the first cassette is withdrawn from the cassette holder when said actuating lever rotates to a position beyond said position at which the actuating lever contacts said cassette holder in the eject position, and said second resilient member is not released when said actuating lever rotates only small amounts or when said cassette holder remains in the eject position.

8. A cassette changer according to claim 2, further including a chassis, a large segment gear, a lever rotatable to a rotated position in response to loading of the second cassette in said cassette loading means, first locking means for locking said locking said large segment gear in a position distant from said lever and second locking means for locking said lever in the rotated position, wherein said first resilient member is extended between said large segment gear and said lever, and said fifth resilient member is extended between said lever and a point on said chassis, so that both said first resilient member and said fifth resilient member are deflected when said lever is rotated while said locking means holds said large segment gear in the distant position, said first resilient member is released and said eject mode is selected when the first locking means releases said large segment gear, and said fifth resilient member is released and said operating mode selector is moved to said second position when the second locking means releases said lever from its rotated position.

9. A cassette changer according to claim 2, further including a chassis, a small segment gear and a support lever rotatable in response to loading of the second cassette in said loading means, third locking means for locking said small segment gear in a position distant from said support lever, and fourth locking means for locking said support lever in its rotated position, wherein said second resilient member is extended between said small segment gear and said support lever, and said third resilient member is extended between said support lever and a point on said chassis, so that both said second resilient member and said third resilient member are deflected when said support lever is rotated while said third locking means holds said small segment gear in the distant position, said second resilient member is released and the first cassette is withdrawn from said holder when the third locking means releases said small segment gear and said third resilient member is released and the second cassette is inserted in said holder when the fourth locking means releases said support lever.

10. A cassette changer according to claim 2, further including roller means which rotates in one direction and is powered by said second resilient member to withdraw the first cassette from said cassette holder, and which rotates in the other direction and is powered by said third resilient member to insert the second cassette into said cassette holder, said roller means being out of contact with the cassette in the cassette holder when the cassette holder is in the recording and/or reproducing position.

11. A cassette changer according to claim 10, including means to transmit the elastic energy of said second resilient member and said third resilient member to said roller means which means includes a small segment gear, a drive gear engaged with said small segment gear, a pin fixed on the side surface of said drive gear, and a rod spring provided to be able to contact with said pin, in which said drive gear is driven in one direction by forward rotation of said small segment gear, the drive gear is disengaged from said small segment gear when said small segment gear rotates for a predetermined angle, said pin of said drive gear pushes said rod spring to deflect said rod spring, said rod spring pushes said pin to rotate said drive gear in the other direction by the resilient force of said rod spring when the deformation of said rod spring reaches a predetermined amount, and said small segment gear again engages with said drive gear to rotate said drive gear in the opposite direction.

12. A cassette changer according to claim 1, further including a flywheel which cooperates with one of said resilient members, wherein the elastic energy of said one resilient member is transduced to kinetic energy of said flywheel when said one resilient member is released, and the kinetic energy of said flywheel is discharged to effect exchange of said first and second cassettes, so that exchanging of the cassettes is performed smoothly and at moderate speed.

13. A cassette changer according to claim 12, further including a gear with a toothless portion for transmitting the elastic energy of said one resilient member to said fly wheel, at least a tooth arranged adjacent to said toothless portion of said gear, and a circular arc-shaped resilient arm supporting said tooth, whereby said tooth supported by said arm is displaceable both in the radial direction and in the circumferential direction, permitting smooth engagement of the gear with said flywheel.

14. A cassette changer according to claim 1, further including a driving wheel and a rotating lever for transmitting the elastic energy discharged by said one resilient member to said means for exchanging, said rotating lever being made of resilient material, whereby said lever rotates in accordance with the rotation of said driving wheel in one direction and moves said operating mode selector, said rotating lever being deflected by contacting with said operating mode selector, and said driving wheel being rotated in the other direction by the resilient force of said rotating lever, said rotating lever being restored to an original position in accordance with the rotation of said driving wheel.

15. A cassette changer according to claim 3, further including a detecting lever rotatably supported by said lid member to detect the ejected first cassette when said lid is rotated to the open position, and a resiliently urged member arranged to contact with said detecting lever, said detecting lever being forced to rotate relative to said lid member as soon as said detecting lever detects said ejected first cassette, and means movable in response to said detecting lever and resiliently urged member for releasing said second cassette from said cassette loading means for inserting into said cassette holder.

16. A cassette changer according to claim 3, wherein the weight of the exchanged first cassette urges said lid to rotate, so that the rotation of said lid cooperates with said fourth resilient member to move said cassette holder to the recording or reproducing position.

* * * * *